US010982604B2

(12) United States Patent
Yoshioka et al.

(10) Patent No.: US 10,982,604 B2
(45) Date of Patent: *Apr. 20, 2021

(54) GASOLINE ENGINE SYSTEM WITH IMPROVED IDLE UP CONTROL UPON DETECTING ABNORMALITY IN VALVE DURING DECELERATION

(71) Applicant: AISAN KOGYO KABUSHIKI KAISHA, Obu (JP)

(72) Inventors: Mamoru Yoshioka, Nagoya (JP); Masanao Kurita, Toyoake (JP); Masateru Nagao, Ichinomiya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/374,840

(22) Filed: Apr. 4, 2019

(65) Prior Publication Data
US 2019/0293007 A1 Sep. 26, 2019

(30) Foreign Application Priority Data

Mar. 13, 2018 (JP) ................... 2018-046005
Jun. 15, 2018 (JP) ................... 2018-114807

(51) Int. Cl.
*F02D 41/00* (2006.01)
*F02D 41/22* (2006.01)

(52) U.S. Cl.
CPC ..... *F02D 41/0005* (2013.01); *F02D 41/0077* (2013.01); *F02D 41/0097* (2013.01);
(Continued)

(58) Field of Classification Search
CPC ............... F02D 41/123; F02D 41/0077; F02D 41/0005; F02D 41/0097; F02D 41/22;
(Continued)

(56) References Cited

U.S. PATENT DOCUMENTS 5,056,637 A 10/1991 Miyawaki et al.
6,978,602 B2 * 12/2005 Ohtake ................. F02D 41/029
60/285

(Continued)

FOREIGN PATENT DOCUMENTS

JP H3-200433 A 9/1991
JP 2004-204774 A 7/2004
(Continued)

OTHER PUBLICATIONS

Nov. 20, 2018 Office Action issued in Japanese Patent Application No. 2018-114807.

*Primary Examiner* — Gonzalo Laguarda
(74) *Attorney, Agent, or Firm* — Oliff PLC

(57) ABSTRACT

An engine system is provided with an electronic throttle device to regulate intake amount to the engine, an EGR device (EGR valve) to recirculate a part of exhaust gas of the engine to the engine as EGR gas, and an electronic control unit (ECU) to control the electronic throttle device and the EGR valve based on an operating state of the engine. The ECU performs feedback control of the electronic throttle device such that a detected engine rotation number becomes a target idle rotation number, and sets the target idle rotation number to a predetermined first set value for avoiding engine stall until a predetermined time elapses from start of deceleration and then shifts the target idle rotation number to a second set value lower than the first set value after the predetermined time elapses.

11 Claims, 26 Drawing Sheets

(52) U.S. Cl.
CPC ........ *F02D 41/22* (2013.01); *F02D 2200/101* (2013.01); *Y02T 10/40* (2013.01)

(58) Field of Classification Search
CPC ............. F02D 21/08; F02D 2041/0017; F02D 2200/101; Y02T 10/47; Y02T 10/144; F02M 26/06; F02M 26/49
See application file for complete search history.

(56) References Cited

U.S. PATENT DOCUMENTS

| | | | | |
|---|---|---|---|---|
| 8,346,462 | B2 * | 1/2013 | Nakamura | F02D 41/0052 123/568.16 |
| 9,222,441 | B2 * | 12/2015 | Yoshioka | F02D 41/0077 |
| 9,574,526 | B2 * | 2/2017 | Takaki | F02B 37/16 |
| 10,393,044 | B2 * | 8/2019 | Ito | F02D 41/0235 |
| 2004/0123589 | A1 | 7/2004 | Ohtake et al. | |
| 2018/0128192 | A1 * | 5/2018 | Sugiyama | F02M 26/64 |
| 2018/0283326 | A1 * | 10/2018 | Miura | F02M 26/49 |
| 2019/0293007 | A1 * | 9/2019 | Yoshioka | F02D 41/0005 |
| 2019/0338717 | A1 * | 11/2019 | Nagao | F02M 26/19 |

FOREIGN PATENT DOCUMENTS

| | | |
|---|---|---|
| JP | 2007-224763 A | 9/2007 |
| JP | 2012-52505 A | 3/2012 |
| JP | 2017-133372 A | 8/2017 |

* cited by examiner

GASOLINE ENGINE SYSTEM WITH IMPROVED IDLE UP CONTROL UPON DETECTING ABNORMALITY IN VALVE DURING DECELERATION

CROSS-REFERENCE TO RELATED APPLICATIONS

This application is based upon and claims the benefit of priority from each of the prior Japanese Patent Application No. 2018-046005 filed on Mar. 13, 2018 and Japanese Patent Application No. 2018-114087 filed on Jun. 15, 2018, the entire contents of which are incorporated herein by reference.

BACKGROUND

Technical Field

The technique disclosed in this specification relates to a gasoline engine system including an exhaust gas recirculation device (including an exhaust recirculation valve), which recirculates a part of exhaust gas of an engine as exhaust recirculation gas to the engine and an intake air regulating valve regulating an intake air amount sucked into the engine via an intake passage, and being configured to control the exhaust recirculation valve and the intake air regulating valve during deceleration of the engine.

Related Art

Conventionally, as the technique of this type, for example, a technique "controller for an internal combustion engine" described in JP 2017-133372 A is known. This technique includes an EGR device which recirculates a part of exhaust gas of an engine as the EGR gas to the engine, a throttle valve which regulates the intake air amount sucked into the engine via the intake passage, and a controller which controls the EGR device and the throttle valve according to an operating state of the engine. The EGR device includes an EGR passage connecting an exhaust passage and the intake passage of the engine and an EGR valve provided on the EGR passage. The EGR valve has a valve element and a valve seat. An outlet of the EGR passage is connected to the intake passage downstream of the throttle valve. In addition, the intake passage downstream of the throttle valve is provided with an intake pressure sensor which detects an intake pressure at a portion of the intake passage. Here, when the EGR valve is fully closed during the deceleration of the engine or the like, the controller determines whether foreign matters are lodged between the valve element and the valve seat of the EGR valve based on a detection value of the intake pressure sensor. When the controller determines that the foreign matters are lodged, in the case where the engine is in a low load operating state, the intake air amount to the engine is increased by controlling the throttle valve to be opened and a foreign matter removal control which repeats an opening and closing operation of the EGR valve several times is performed. Accordingly, the foreign matters lodged in the EGR valve are removed, and idle up of the engine is performed to avoid engine stall.

SUMMARY

Technical Problem

Herein, in the technique described in JP 2017-133372 A, when it is determined that the foreign matters are lodged in the EGR valve, in the case where the engine is in the low load operating state (during the deceleration or the like), the control for opening the throttle valve is performed to promote the idle up. However, since the intake passage downstream of the throttle valve has a predetermined volume (capacity), the increase in the intake pressure is delayed even if the control for opening the throttle valve is performed during the deceleration of the engine, and the increase in the intake air amount of the engine is delayed and thus the engine is likely to be stalled. Here, in the existing control for the idle up, there is a possibility that drivability of the engine may be deteriorated if the throttle valve is rapidly opened, and therefore the slow opening control is performed to open the throttle valve gradually.

This disclosed technique is made in view of the above-mentioned circumstances, and an object of the technique is to provide a gasoline engine system capable of avoiding an engine stall by avoiding a delay in an increase of intake air due to an idle up in an initial stage of deceleration when an exhaust recirculation valve is not fully closed due to foreign matters lodged or the like during the deceleration of the engine.

Means of Solving the Problem

To achieve the above object, the present disclosure provides a gasoline engine system comprising: an engine; an intake passage which introduces an intake air into the engine; an exhaust passage which discharges an exhaust gas from the engine; an intake air regulating valve which is placed in the intake passage and regulates an intake air amount flowing through the intake passage; an exhaust gas recirculation device including: an exhaust gas recirculation passage which brings a part of the exhaust gas discharged from the engine to the exhaust passage into the intake passage and brings back to the engine as an exhaust recirculation gas; and an exhaust recirculation valve which regulates a flow rate of the exhaust recirculation gas in the exhaust gas recirculation passage, the exhaust recirculation valve including a valve seat and a valve element seatably provided on the valve seat, an operating state detection unit which detects an operating state of the engine; and a controller which controls at least the intake air regulating valve and the exhaust recirculation valve based on the detected operating state of the engine, wherein the operating state detection unit includes a rotation number detection unit which detects a rotation number of the engine, the controller is configured to diagnose abnormality related to opening and closing between the valve seat and the valve element in the exhaust recirculation valve based on the detected operating state, and when the engine is decelerated and it is determined that the abnormality occurs, the controller performs an idle up control which includes performing a feedback control on the intake air regulating valve so that the detected rotation number becomes a predetermined target idle rotation number in order to avoid an engine stall, setting the target idle rotation number to a predetermined first set value in order to avoid the engine stall until a predetermined time elapses after determining occurrence of the abnormality, and shifting the target idle rotation number to a second set value which is lower than the first set value and higher than a predetermined basic idle rotation number after the predetermined time elapses.

According to this disclosed technique, when the exhaust recirculation valve is not fully closed due to the foreign matters lodged or the like during the deceleration of the engine, it is possible to avoid a delay in an increase of intake

DETAILED DESCRIPTION OF THE EXEMPLARY EMBODIMENTS

First Embodiment

Hereinafter, a first embodiment in which an engine system is embodied in a gasoline engine system will be described in detail with reference to the accompanying drawings.
(Overview of Engine System)

Figure 1:
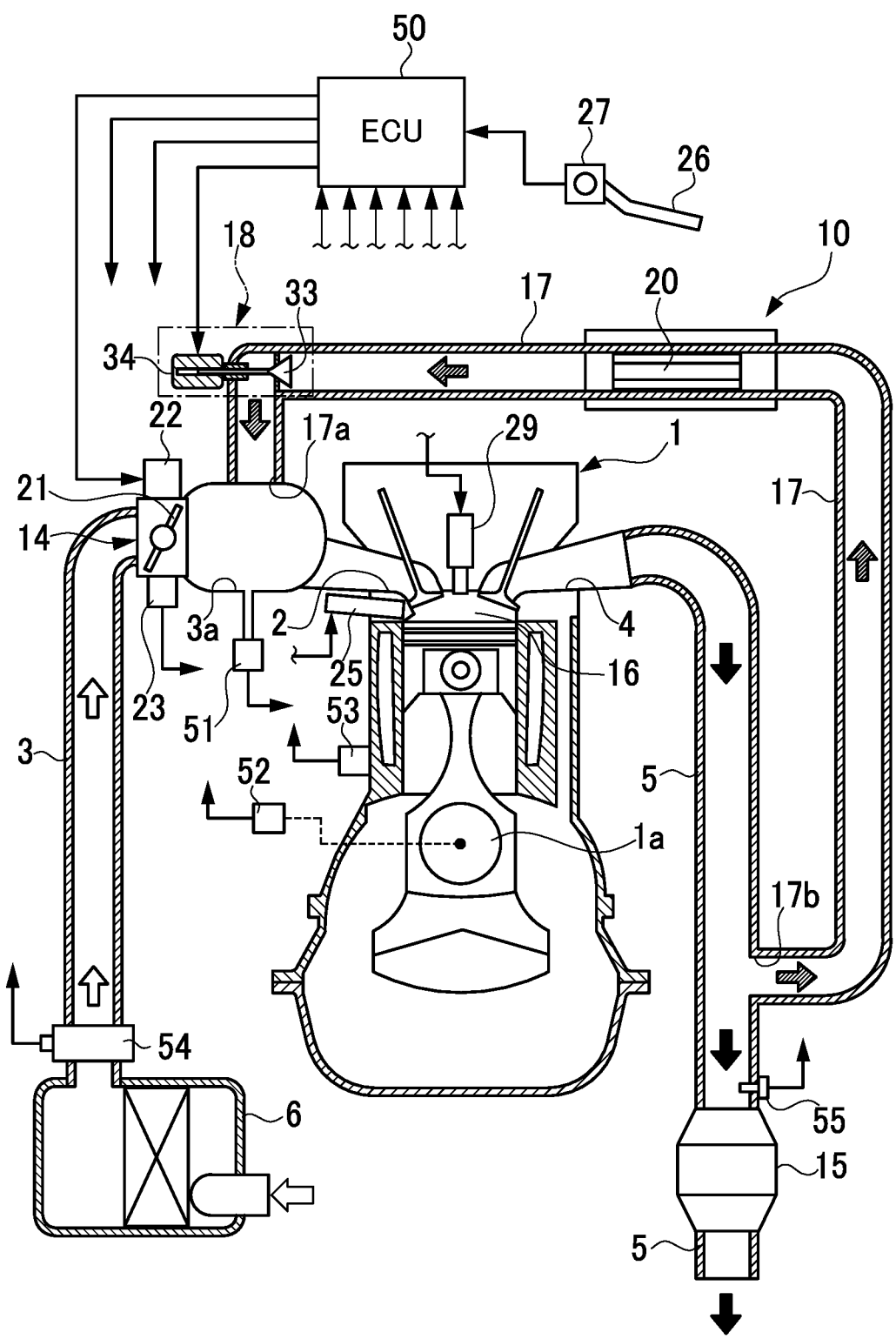
FIG. 1 is a schematic configuration diagram showing a gasoline engine system in a first embodiment.

FIG. 1 shows a schematic configuration diagram of a gasoline engine system (hereinafter, simply referred to as an "engine system") according to the present embodiment. The engine system mounted on a vehicle includes a reciprocating type engine 1. An intake passage 3 is connected to an intake port 2 of the engine 1, and an exhaust passage 5 is connected to an exhaust port 4. An inlet of the intake passage 3 is provided with an air cleaner 6.

The intake passage 3 is provided with a surge tank 3a, and the intake passage 3 upstream of the surge tank 3a is provided with an electronic throttle device 14. The electronic throttle device 14 includes a throttle valve 21, a DC motor 22 for opening and closing the throttle valve 21, and a throttle sensor 23 for detecting an opening degree (throttle opening degree) TA of the throttle valve 21. The electronic throttle device 14 regulates the opening degree of the throttle valve 21 by driving the DC motor 22 in accordance with an operation of an accelerator pedal 26 by an operator. The exhaust passage 5 is provided with a catalytic converter 15 for purifying an exhaust gas.

The engine 1 is provided with an injector 25 for injecting fuel into a combustion chamber 16. The injector 25 is supplied with fuel from a fuel tank (not shown). The injector 25 corresponds to an example of a fuel supply unit in this disclosed technique. In addition, the engine 1 is provided with an ignition device 29 for igniting a mixture of fuel and intake air formed in the combustion chamber 16.

The engine system is provided with a high-pressure loop type exhaust gas recirculation device (EGR device) 10. The EGR device 10 is a device for recirculating a part of the exhaust gas discharged from the combustion chamber 16 of the engine 1 to the exhaust passage 5 as exhaust recirculation gas (EGR gas) to the combustion chamber 16, and includes an exhaust gas recirculation passage (EGR passage) 17 through which the EGR gas flows from the exhaust passage 5 into the intake passage 3 and an exhaust recirculation valve (EGR valve) 18 provided in the EGR passage 17 for regulating a flow rate of the EGR gas in the EGR passage 17. The EGR passage 17 is provided between the exhaust passage 5 and the surge tank 3a of the intake passage 3. That is, an outlet 17a of the EGR passage 17 is connected to the surge tank 3a downstream of the electronic throttle device 14. An inlet 17b of the EGR passage 17 is connected to the exhaust passage 5 upstream of the catalytic converter 15.

The EGR passage 17 is provided with an EGR cooler 20 for cooling the EGR gas flowing through the EGR passage 17, and the EGR valve 18 is provided in the EGR passage 17 downstream of the EGR cooler 20.

(Configuration of EGR Valve)

Figure 2:
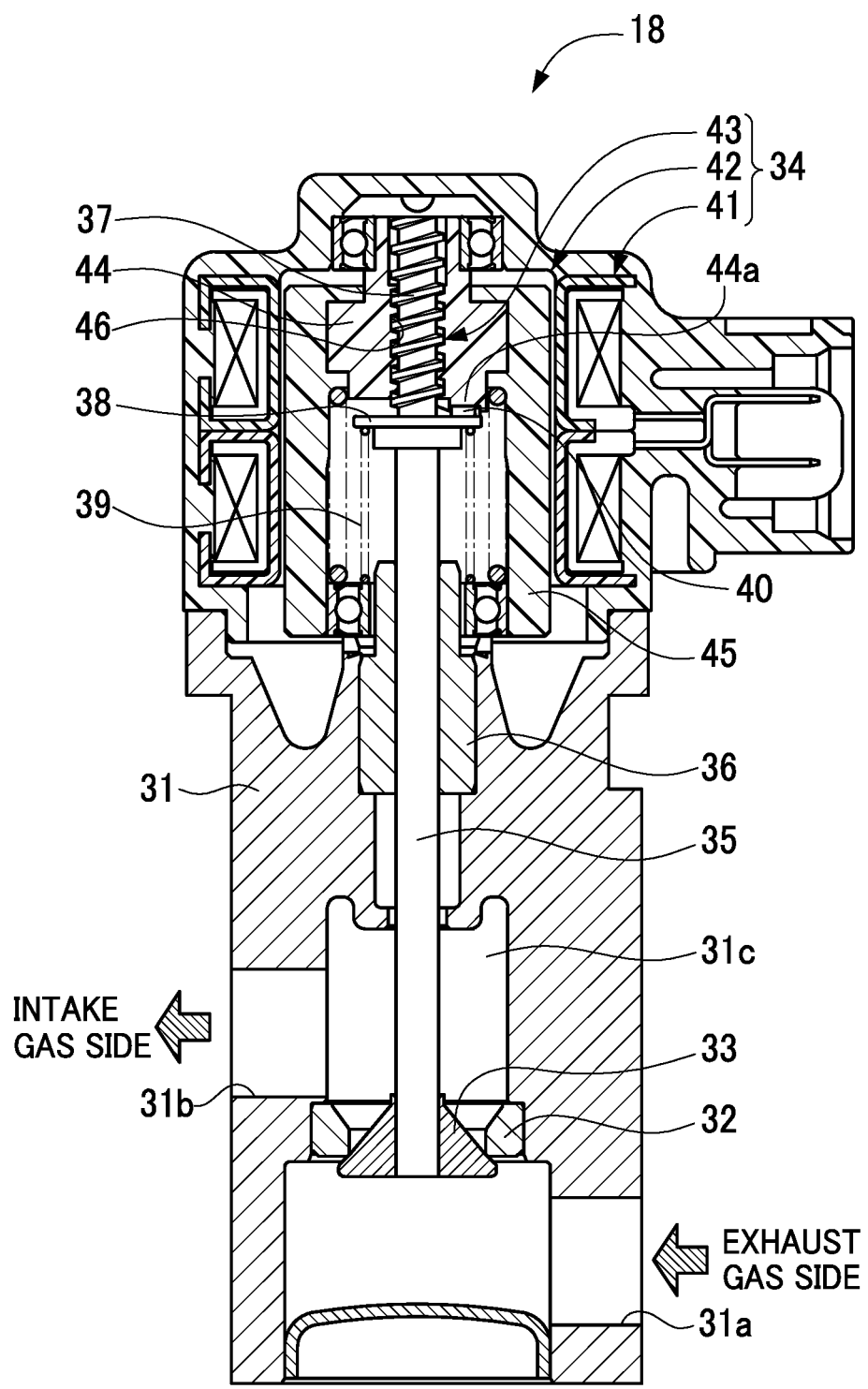
FIG. 2 is a cross-sectional view of an exhaust gas recirculation (EGR) valve in the first embodiment.
Figure 3:
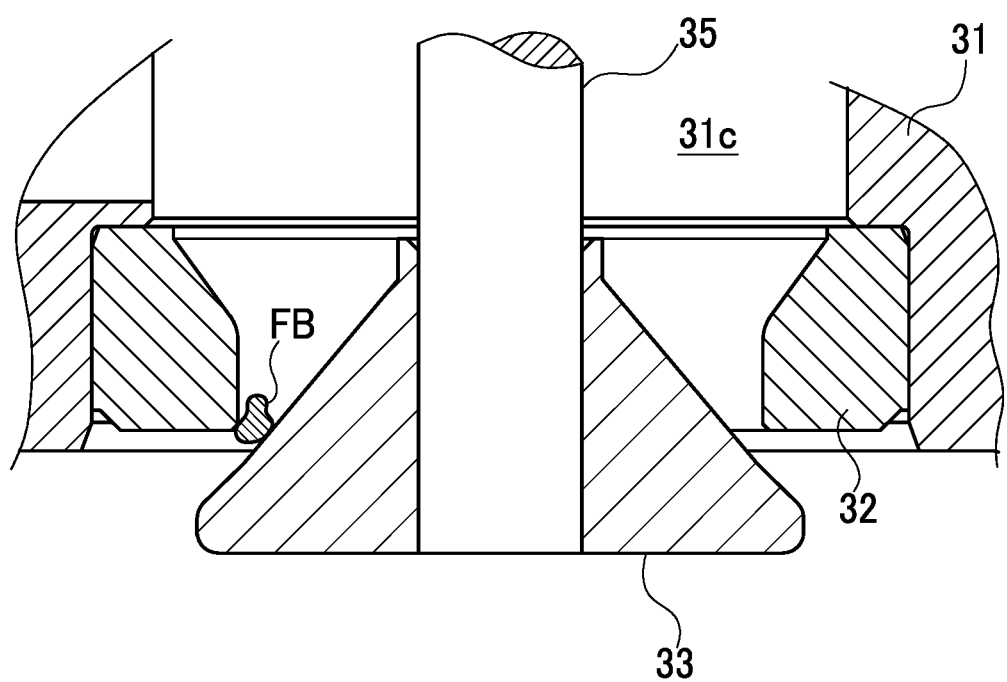
FIG. 3 is an enlarged cross-sectional view of a part of the EGR valve in the first embodiment.

FIG. 2 shows a cross-sectional view of a configuration of the EGR valve 18. FIG. 3 shows an enlarged cross-sectional view of a part of the EGR valve 18. As shown in FIG. 2, the EGR valve 18 is constituted by a poppet type motor-operated valve. That is, the EGR valve 18 includes a housing 31, a valve seat 32 provided in the housing 31, a valve element 33 seatably and movably provided relative to the valve seat 32 in the housing 31, and step motor 34 for stroke motion of the valve element 33. The housing 31 has an inlet port 31a through which the EGR gas is introduced from the exhaust passage 5 side (exhaust side), an outlet port 31b through which the EGR gas is discharged to the intake passage 3 side (intake side), and a communication passage 31c through which the inlet port 31a and the outlet port 31b communicate with each other. The valve seat 32 is provided in a middle of the communication passage 31c.

The step motor 34 is provided with an output shaft 35 configured to be able to linearly reciprocate (stroke motion), and the valve element 33 is fixed to a tip of the output shaft 35. The output shaft 35 is supported with respect to the housing 31 in the stroke motion manner via a bearing 36 provided in the housing 31. An upper end part of the output shaft 35 is provided with a male screw portion 37. The middle of the output shaft 35 (near a lower end of the male screw portion 37) is provided with a spring receiver 38. A lower surface of the spring receiver 38 is a receiving surface of a compression spring 39, and an upper surface of the spring receiver 38 is provided with a stopper 40.

The valve element 33 has a conical shape, and a conical surface of the valve element 33 comes into contact with or is separated from the valve seat 32. The valve element 33 comes into contact with the valve seat 32, and as a result, the valve element 33 is fully closed, and the valve element 33 is separated from the valve seat 32, and as a result, the valve element 33 is opened. The valve element 33 is urged toward the step motor 34 by the compression spring 39 provided between the spring receiver 38 and the housing 31, that is, in the direction of closing the valve which seats on the valve seat 32. The valve element 33 in the fully closed state performs the stroke motion against an urging force of the compression spring 39 by the output shaft 35 of the step motor 34, so that the valve element 33 is separated (opened) from the valve seat 32. At the time of opening the valve element 33, the valve element 33 moves toward an upstream side (exhaust side) of the EGR passage 17. Thus, the EGR valve 18 moves from the fully closed state in which the valve element 33 is seated on the valve seat 32 to the upstream side of the EGR passage 17 against an exhaust pressure or an intake pressure of the engine 1, so that the valve element 33 is separated from the valve seat 32 and the valve is opened. On the other hand, in the opened state, the valve element 33 moves in an urging direction of the compression spring 39 by the output shaft 35 of the step motor 34, so that the valve element 33 is closed by approaching the valve seat 32. At the time of closing the valve element 33, the valve element 33 moves toward a downstream side (intake side) of the EGR passage 17.

In the present embodiment, the opening degree of the valve element 33 with respect to the valve seat 32 is regulated by the stroke motion of the output shaft 35 of the step motor 34. The output shaft 35 of the EGR valve 18 is provided so as to be capable of performing the stroke motion by a predetermined stroke from the fully closed state in which the valve element 33 is seated on the valve seat 32 to the fully opened state in which the valve element 33 is maximally separated from the valve seat 32.

The step motor 34 includes a coil 41, a magnet rotor 42, and a conversion mechanism 43. The step motor 34 is excited by applying a current to the coil 41 to rotate the magnet rotor 42 by a predetermined number of motor steps and converts the rotational movement of the magnet rotor 42 into the stroke motion of the output shaft 35 by the conversion mechanism 43. In accordance with the stroke motion of the output shaft 35, the valve element 33 performs the stroke motion with respect to the valve seat 32.

The magnet rotor 42 includes a resin-made rotor main body 44 and an annular plastic magnet 45. The center of the rotor main body 44 is provided with a female screw portion 46 screwed to the male screw portion 37 of the output shaft 35. In the state in which the female screw portion 46 of the rotor main body 44 and the male screw portion 37 of the output shaft 35 are screwed to each other, the rotor main body 44 rotates to convert the rotational motion into the stroke motion of the output shaft 35. Here, the above-described conversion mechanism 43 is configured by the male screw portion 37 and the female screw portion 46. A lower part of the rotor main body 44 is provided with an abutting portion 44a on which the stopper 40 of the spring receiver 38 abuts. When the EGR valve 18 is fully closed, an end surface of the stopper 40 is in surface contact with an end surface of the abutting portion 44a, and thus an initial position of the output shaft 35 is restricted.

In the present embodiment, the opening degree of the valve element 33 of the EGR valve 18 is finely regulated stepwise from the fully closed state to the fully opened state by changing the number of motor steps of the step motor 34 stepwise.

(Electrical Configuration of Engine System)

As shown in FIG. 1, the engine system of the present embodiment includes an electronic control unit (ECU) 50 responsible for various controls. The ECU 50 controls the injector 25, the ignition device 29, the electronic throttle device 14 (DC motor 22), and the EGR valve 18 (step motor 34), respectively, according to the operating state of the engine 1. The ECU 50 outputs a predetermined command signal to each of the motor 34 and the motor 22 in order to control the EGR valve 18 and the electronic throttle device 14. The ECU 50 includes a central processing unit (CPU), various memories for storing predetermined control programs and the like in advance or temporarily storing calculation results and the like of the CPU, and an external input circuit and an external output circuit connected to each of these units. The ECU 50 corresponds to an example of the controller in this disclosed technique. The injector 25, the ignition device 29, the electronic throttle device 14 (DC motor 22), and the EGR valve 18 (step motor 34) are connected to the external output circuit. Various sensors 27 and 51 to 55 for detecting the operating state of the engine 1 in addition to the throttle sensor 23 are connected to the external input circuit. Various sensors 23, 27, and 51 to 55 correspond to an example of an operating state detection unit in this disclosed technique.

Here, in addition to the throttle sensor 23, an accelerator sensor 27, an intake pressure sensor 51, a rotation number sensor 52, a water temperature sensor 53, an air flow meter 54, and an air-fuel ratio sensor 55 are provided as various sensors. The accelerator sensor 27 detects an operation amount of the accelerator pedal 26 as an accelerator opening degree ACC and outputs the detection signal. The intake pressure sensor 51 detects the pressure in the surge tank 3a downstream of the electronic throttle device 14 as an intake pressure PM and outputs the detection signal. The intake pressure sensor 51 corresponds to an example of an intake pressure detection unit in this disclosed technique. The rotation number sensor 52 detects the rotation angle (crank angle) of a crank shaft 1a of the engine 1, detects a change in a crank angle (crank angular velocity) as the rotation number NE of the engine 1 (engine rotation number), and outputs the detection signal. The rotation number sensor 52 corresponds to an example of the rotation number detection unit and the crank angular velocity detection unit in this disclosed technique. The water temperature sensor 53 detects the temperature of the cooling water flowing inside the engine 1 as a cooling water temperature THW and outputs the detection signal. The air flow meter 54 detects an intake air amount Ga flowing in the intake passage 3 immediately downstream of the air cleaner 6 and outputs the detection signal. The air-fuel ratio sensor 55 detects an air-fuel ratio A/F in the exhaust gas in the exhaust passage 5 immediately upstream of the catalytic converter 15 and outputs the detection signal.

In the present embodiment, the ECU 50 controls the EGR valve 18 in order to execute the EGR control according to the operating state of the engine 1 in the entire operating range of the engine 1. On the other hand, when the engine 1 is decelerated and the fuel supply to the engine 1 is shut off (deceleration fuel cut), the ECU 50 controls the EGR valve 18 to be fully closed in order to shut off the flow of EGR.

Here, as shown in FIG. 3, the problem of the lodging or the attachment of foreign matter FB such as deposit between the valve seat 32 and the valve element 33 is caused in the EGR valve 18. In the present embodiment, the ECU 50 performs the "diagnostic control of foreign matters lodged" in order to diagnose the "abnormality related to opening and closing of the EGR valve 18" including the foreign matters FB lodged between the valve seat 32 and the valve element 33. In addition, in the present embodiment, the ECU 50 is configured to execute the "removal control of the foreign matter" in order to remove the foreign matter FB lodged in the EGR valve 18. In addition, in the present embodiment, when the engine 1 is decelerated, the ECU 50 performs "idle up control during deceleration" to avoid an engine stall or the like when the foreign matter FB is lodged in the EGR valve 18.

(Diagnostic Control of Foreign Matter Lodged)

Figure 4:
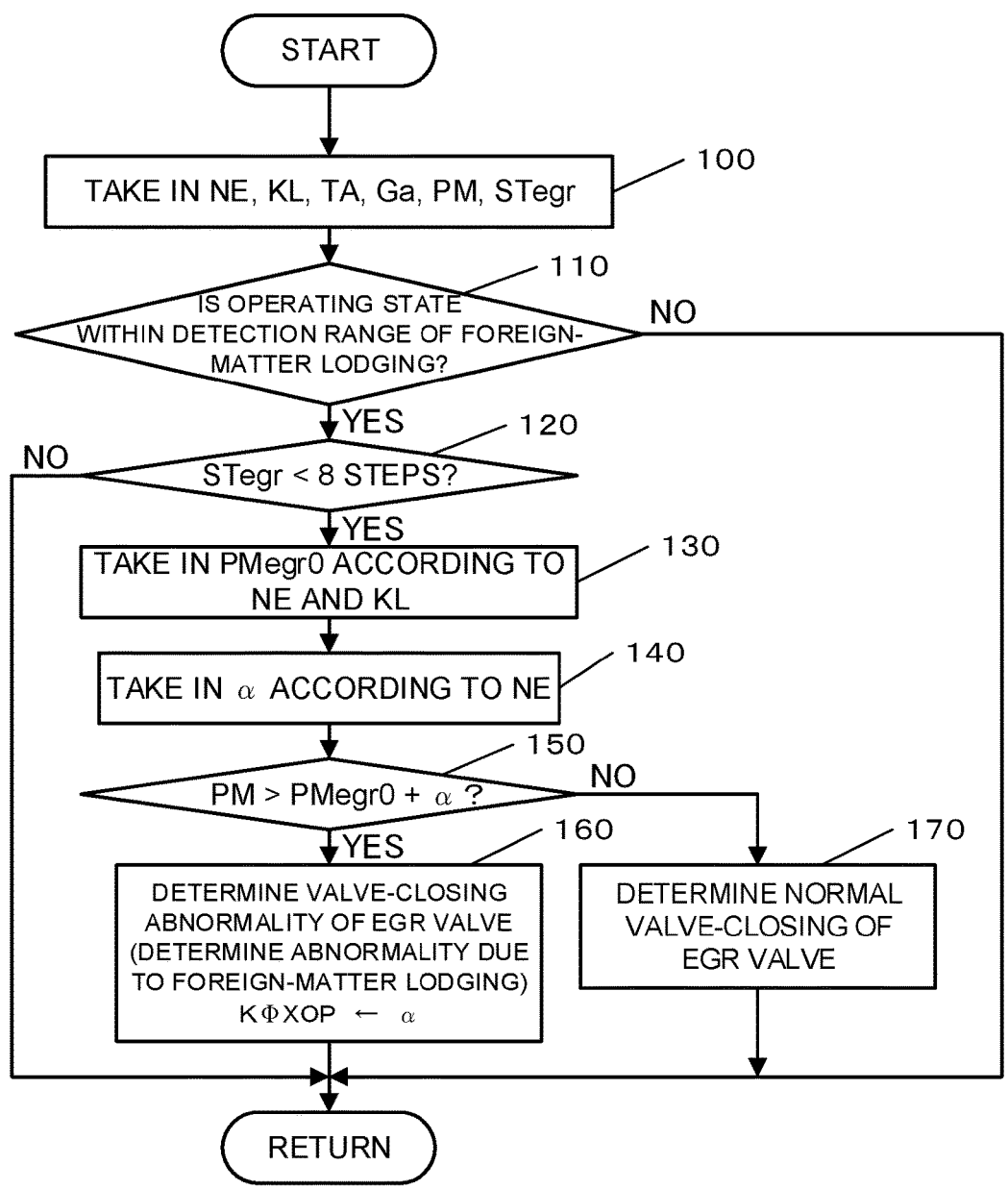
FIG. 4 is a flowchart showing a content of a diagnostic control of foreign matters lodged in the first embodiment.

First, a foreign-matter lodging diagnosis control of the EGR valve 18 will be described. FIG. 4 is a flowchart showing an example of this control content. This flowchart shows the process content for diagnosing the presence or absence of abnormality of foreign matters lodged in the EGR valve 18 when the EGR valve 18 is controlled to be fully closed or closed during the deceleration of the engine 1.

When the process proceeds to this routine, first, in step 100, the ECU 50 takes various signals indicating the operating state of the engine 1 from various sensors 23, 51, 52, 54, and the like. That is, the ECU 50 takes an engine rotation number NE, an engine load KL, a throttle opening degree TA, an intake air amount Ga, an intake pressure PM, and the number of motor steps STegr of the step motor 34 corresponding to the opening degree of the EGR valve 18, respectively. Here, the ECU 50 can obtain an engine load KL based on the throttle opening degree TA or the intake pressure PM. In addition, the number of motor steps STegr has a relationship proportional to the opening degree of the EGR valve 18 (EGR opening degree), that is, the opening degree of the valve element 33 with respect to the valve seat 32.

Next, in step 110, the ECU 50 determines whether the operating state of the engine 1 is within a foreign-matter lodging detection range. For example, the ECU 50 can determine whether the range defined from the relationship between the engine rotation number NE and the engine load KL is within a predetermined detection range suitable for the foreign-matter lodging detection. The deceleration operation or the normal operation of the engine 1 is included in this predetermined detection range. The ECU 50 shifts the process to step 120 if the determination result is affirmative, and returns the process to step 100 if the determination result is negative.

In step 120, the ECU 50 determines whether the number of motor steps STegr is smaller than "eight steps". The "eight steps" is an example and correspond to the minute opening degree of the EGR valve 18. The ECU 50 shifts the process to step 130 if the determination result is affirmative, and returns the process to step 100 if the determination result is negative.

Figure 5:
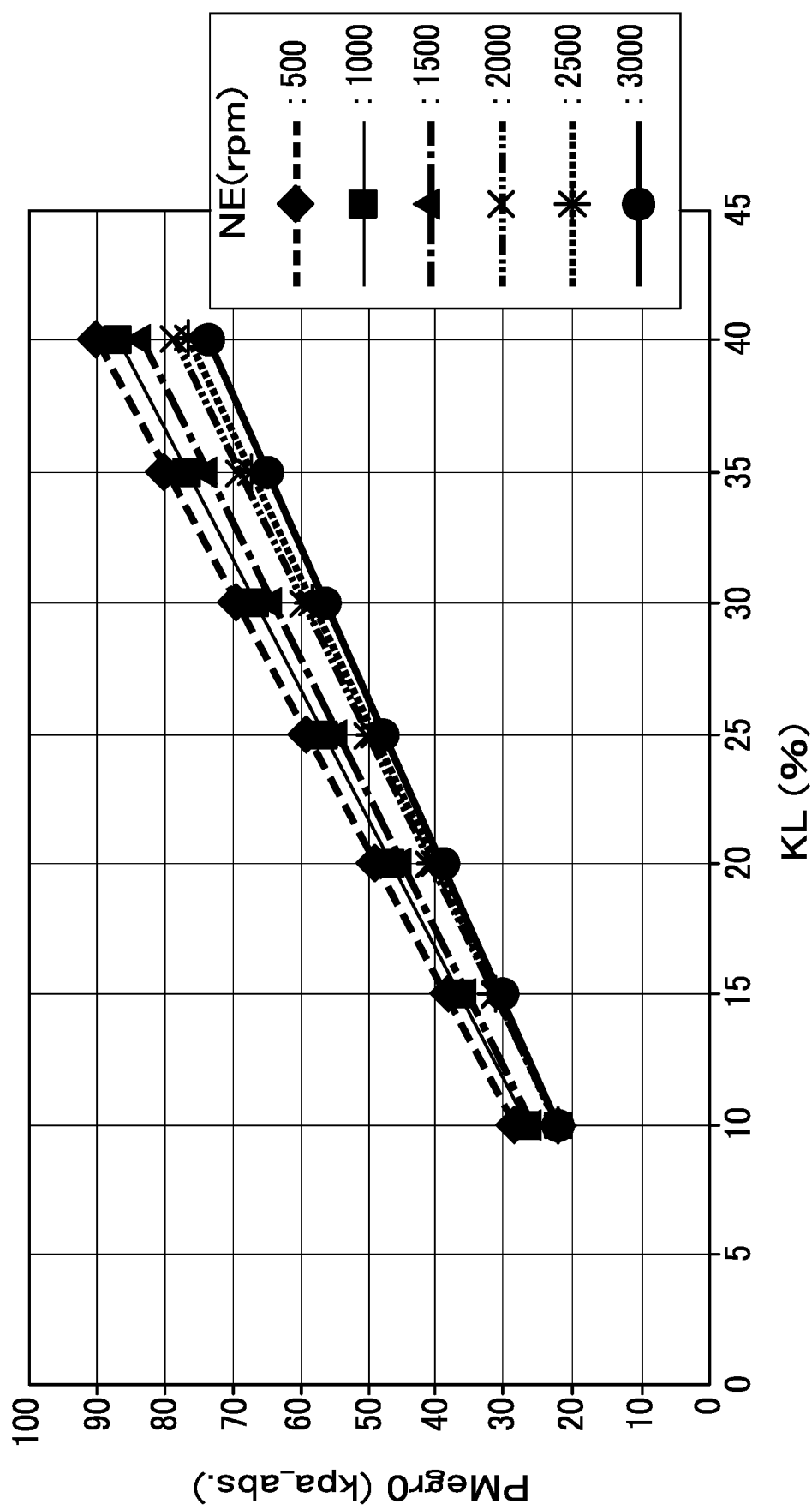
FIG. 5 is a fully closed reference intake pressure map referenced to obtain a fully closed reference intake pressure during deceleration which corresponds to an engine rotation number and an engine load in the first embodiment.

In step 130, the ECU 50 takes a fully closed reference intake pressure PMegr0 during the deceleration according to the engine rotation number NE and the engine load KL. The ECU 50 can obtain the fully closed reference intake pressure PMegr0 during deceleration corresponding to the engine rotation number NE and the engine load KL, for example, by referring to the fully closed reference intake pressure map set in advance as shown in FIG. 5. The fully closed reference intake pressure map is a map in which the relationship of the fully closed reference intake pressure PMegr0 to the engine rotation number NE and the engine load KL when the opening degree (EGR opening degree) of the valve element 33 of the EGR valve 18 is "0", namely, at the time of fully closing is set in advance. Here, in general, the intake pressure PM during the deceleration of the engine 1 has a correlation with the engine load KL regardless of the presence or absence of the foreign matters lodged in the EGR valve 18, and the intake pressure PM and the engine load KL are substantially proportional. However, since the intake pressure PM changes according to the engine rotation number NE, in FIG. 5, the fully closed reference intake pressure PMegr0 is set for the engine rotation number NE and the engine load KL.

Next, in step 140, the ECU 50 takes a pressure increase margin α according to the engine rotation number NE. The ECU 50 can obtain the pressure increase margin α by referring to a predetermined map set in advance. The pressure increase margin α is added to the fully closed reference intake pressure PMegr0 to allow an error or the like at the time of determination described later.

Next, in step 150, the ECU 50 determines whether the detected intake pressure PM is larger than a result obtained by adding the fully closed reference intake pressure PMegr0 to the pressure increase margin α. The ECU 50 shifts the process to step 160 if the determination result is affirmative, and shifts the process to step 170 if the determination result is negative.

In step 160, the ECU 50 determines that the EGR valve 18 becomes abnormal due to the foreign matters lodged, that is, the EGR valve 18 has valve opening abnormality, and stores the determination result in a memory. In addition, the ECU 50 stores the map defining a relationship of a diameter of foreign-matter lodged to the pressure increase margin α which changes according to the foreign-matter diameter. Thus, in step 160, the ECU 50 obtains and stores in the memory a "diameter of foreign-matter lodging KΦXOP" corresponding to the pressure increase margin α taken with reference to the stored map in step 140. Furthermore, the ECU 50 can perform a predetermined abnormality notification control in response to the determination result of the valve opening abnormality. Thereafter, the ECU 50 returns the process to step 100.

On the other hand, in step 170, the ECU 50 determines that the EGR valve 18 is fully closed and is normal, and returns the process to step 100.

According to the above-described diagnostic control of foreign matters lodged, the ECU 50 is configured to diagnose the abnormality related to the opening and closing of the EGR valve 18 based on the operating state of the engine 1. When it is determined that the abnormality occurs, the ECU 50 calculates a diameter (diameter of foreign-matter lodging KΦXOP) of a foreign matter FB lodged between the valve seat 32 and the valve element 33 based on the detected intake pressure PM.

Further, according to this diagnostic control of foreign matters lodged, when the engine 1 is decelerated and the ECU 50 controls the EGR valve 18 to be fully closed or performs the closing valve control, the ECU 50 obtains the fully closed reference intake pressure PMegr0 according to the EGR opening degree, the engine rotation number NE, and the engine load KL by referring to the fully closed reference intake pressure map (reference function map). The ECU 50 diagnoses the presence or absence of the abnormality related to the opening and closing of the EGR valve 18 by comparing the fully closed reference intake pressure PMegr0 with the detected intake pressure PM.

(Foreign-Matter Removal Control of EGR Valve)

Figure 6:
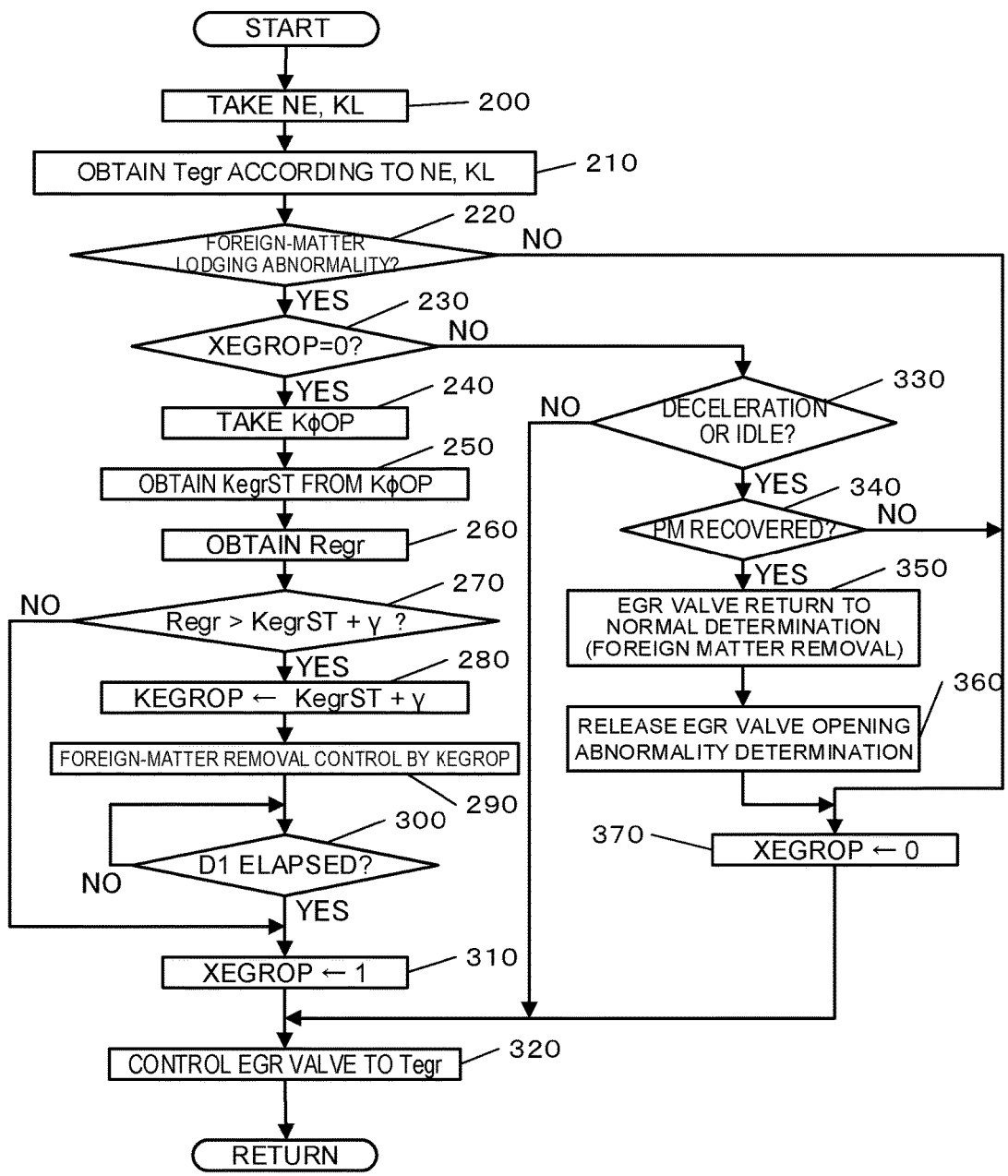
FIG. 6 is a flowchart showing a content of a removal control of foreign matters in the first embodiment.

Next, the removal control of foreign matters of the EGR valve 18 executed in connection with the above-described foreign-matter lodging diagnosis control will be described. FIG. 6 shows a flowchart showing an example of this control content.

When the process proceeds to this routine, in step 200, the ECU 50 takes the engine rotation number NE and the engine load KL, respectively, based on the values detected by the rotation number sensor 52, the throttle sensor 23, and the like.

Next, in step 210, the ECU 50 obtains a target EGR opening degree Tegr of the EGR valve 18 according to the engine rotation number NE and the engine load KL. The ECU 50 can obtain the target EGR opening degree Tegr according to the engine rotation number NE and the engine load KL, for example, by referring to the predetermined target EGR opening degree map.

Next, in step 220, the ECU 50 determines whether the EGR valve 18 is abnormal due to foreign matters lodged. The ECU 50 can perform this determination based on the determination result of the diagnostic control of foreign matters lodged in the EGR valve described above. The ECU 50 shifts the process to step 230 if the determination result is affirmative and shifts the process to step 370 if the determination result is negative.

In step 230, the ECU 50 determines whether the foreign matter removal flag XEGROP is "0". The flag XEGROP is set to "1" when the removal control of the foreign matters (foreign-matter removal control) lodged in the EGR valve 18 is executed as described later. The ECU 50 shifts the process to step 240 if the determination result is affirmative and shifts the process to step 330 if the determination result is negative.

In step 240, the ECU 50 takes a foreign matter diameter equivalent ratio KΦOP. The ECU 50 can obtain the foreign matter diameter equivalent ratio KΦOP by dividing the intake pressure PM detected at the time of the foreign-matter lodging determination by the intake pressure at a normal state (fully closed reference intake pressure PMegr0 obtained from the relationship between the engine rotation number NE and the engine load KL).

Next, in step 250, the ECU 50 obtains an EGR opening degree (foreign matter diameter equivalent opening degree) KegrST corresponding to the foreign matter diameter from the foreign matter diameter equivalent ratio KΦOP. For example, the ECU 50 can obtain the foreign matter diameter equivalent opening degree KegrST according to the foreign matter diameter equivalent ratio KΦOP by referring to a predetermined foreign matter diameter equivalent opening degree map Next, in step 260, the ECU 50 obtains an actual EGR opening degree (actual EGR opening degree) Regr of the EGR valve 18. The ECU 50 can obtain the actual EGR opening degree Regr according to the number of motor steps STegr of the step motor 34, for example, by referring to a predetermined actual EGR opening degree map.

Next, in step 270, the ECU 50 determines whether the actual EGR opening degree Regr is larger than a result obtained by adding a predetermined value γ to the foreign matter diameter equivalent opening degree KegrST. The predetermined value γ is an integer added to control the EGR valve 18 to be an opening degree larger than the foreign matter diameter equivalent opening degree KegrST. The ECU 50 shifts the process to step 280 if the determination result is affirmative and shifts the process to step 310 if the determination result is negative.

In step 280, the ECU 50 sets a result obtained by adding the predetermined value γ to the foreign matter diameter equivalent opening degree KegrST as a foreign matter removal opening degree KEGROP for removing the foreign matter FB from the EGR valve 18.

Next, in step 290, the ECU 50 performs the removal control of foreign matters by the foreign matter removal opening degree KEGROP. That is, the ECU 50 controls the EGR valve 18 from the actual EGR opening degree Regr to the foreign matter removal opening degree KEGROP. In this case, the foreign matter FB lodged between the valve seat 32 and the valve element 33 is released, and the foreign matter FB is peeled off or blown off from the valve seat 32 or the valve element 33 by the flow of the EGR gas in the EGR passage 17.

Next, in step 300, the ECU 50 shifts the process to step 310 after waiting for an elapse of a predetermined time D1.

After shifting from step 270 or step 300, in step 310, the ECU 50 sets the foreign matter removal flag XEGROP to "1".

Thereafter, in step 320, the ECU 50 controls the EGR valve 18 to be the target EGR opening degree Tegr and returns the process to step 200.

On the other hand, after being shifted from step 220, in step 370, the ECU 50 sets the foreign matter removal flag XEGROP to "0" and shifts the process to step 320.

Further, after being shifted from step 230, in step 330, the ECU 50 determines whether the operation of the engine 1 is decelerated or idle. The ECU 50 can perform this determination based on, for example, the throttle opening degree TA and the engine rotation number NE. The ECU 50 shifts the process to step 340 if the determination result is affirmative and shifts the process to step 320 if the determination result is negative.

In step 340, the ECU 50 determines whether the intake pressure PM is recovered to the intake pressure at a normal state (the fully closed reference intake pressure PMegr0 that can be obtained from the relationship between the engine rotation number NE and the engine load KL). The ECU 50 shifts the process to step 350 if the determination result is affirmative and shifts the process to step 370 if the determination result is negative.

In step 350, the ECU 50 determines that the EGR valve 18 is returned to a normal state because the foreign matter is removed. The ECU 50 can store the determination result in the memory.

Next, in step 360, the ECU 50 releases the opening valve abnormality determination of the EGR valve 18 and shifts the process to step 370. The ECU 50 can delete, for example, the valve opening abnormality determination result stored in the memory.

According to the above-described removal control of the foreign matter, when it is determined that the EGR valve 18 has the opening valve abnormality (foreign-matter lodging abnormality), the ECU 50 obtains the opening degree (foreign matter diameter equivalent opening degree KegrST) corresponding to the diameter of the foreign matter FB lodged between the valve seat 32 and the valve element 33 based on the detected intake pressure PM and the obtained fully-closed reference intake pressure PMegr0, and controls the step motor 34 to open the valve element 33 with the opening degree (foreign matter removal opening degree KEGROP) larger than the obtained opening degree (foreign matter diameter equivalent opening degree KegrST) in order to remove the foreign matter FB between the valve seat 32 and the valve element 33.

(Idle Up Control During Deceleration)

Figure 7:
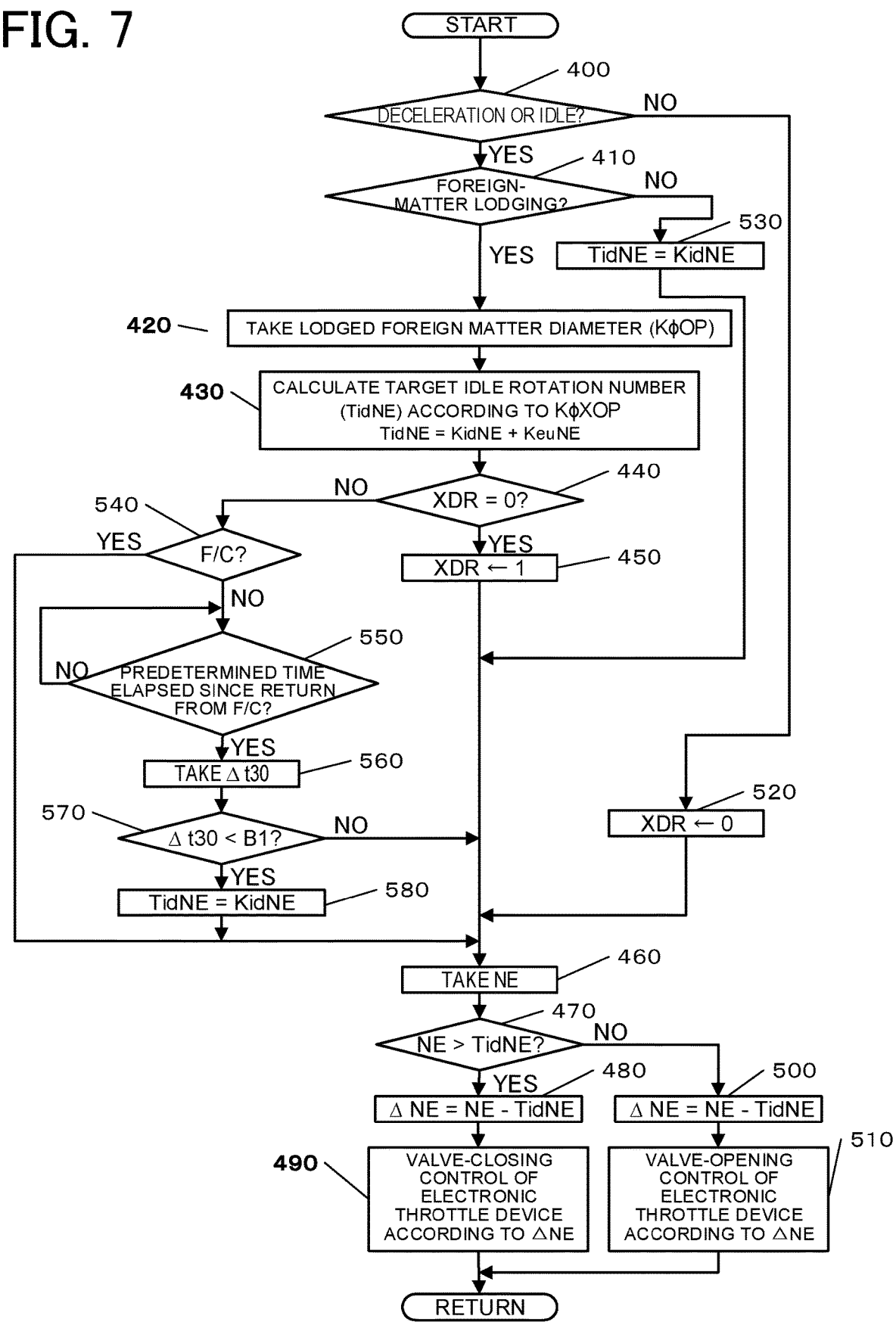
FIG. 7 is a flowchart showing a content of a control of an idle up during deceleration according to the first embodiment.

Next, the idle up control during the deceleration executed in connection with the above-described diagnostic control of foreign matters lodged will be described. FIG. 7 shows a flowchart showing an example of this control content. During deceleration of the engine 1, if the EGR valve 18 which should be controlled to be fully closed is not fully closed due to the foreign matter FB lodged or the like, the EGR gas leaks to the engine 1 to cause the misfire of the engine 1 and the engine stall. Therefore, in the present embodiment, when it is determined that the foreign matter FB is lodged in the EGR valve 18, the idle up control during the deceleration is executed to avoid the engine stall.

When the process shifts to this routine, in step 400, the ECU 50 determines whether the operation of the engine 1 is decelerated or idle. The ECU 50 can perform this determination based on, for example, the throttle opening degree TA and the engine rotation number NE. The ECU 50 shifts the process to step 410 if the determination result is affirmative and shifts the process to step 520 if the determination result is negative.

In step 410, it is determined whether foreign matters are lodged in the EGR valve 18. The ECU 50 can make this determination based on the result of the diagnostic control of foreign matters lodged described above. The ECU 50 shifts the process to step 420 if the determination result is affirmative and shifts the process to step 530 if the determination result is negative.

In step 420, the ECU 50 takes the stored diameter of foreign-matter lodging KΦOP with the diagnostic control of foreign matters lodged.

Figure 8:
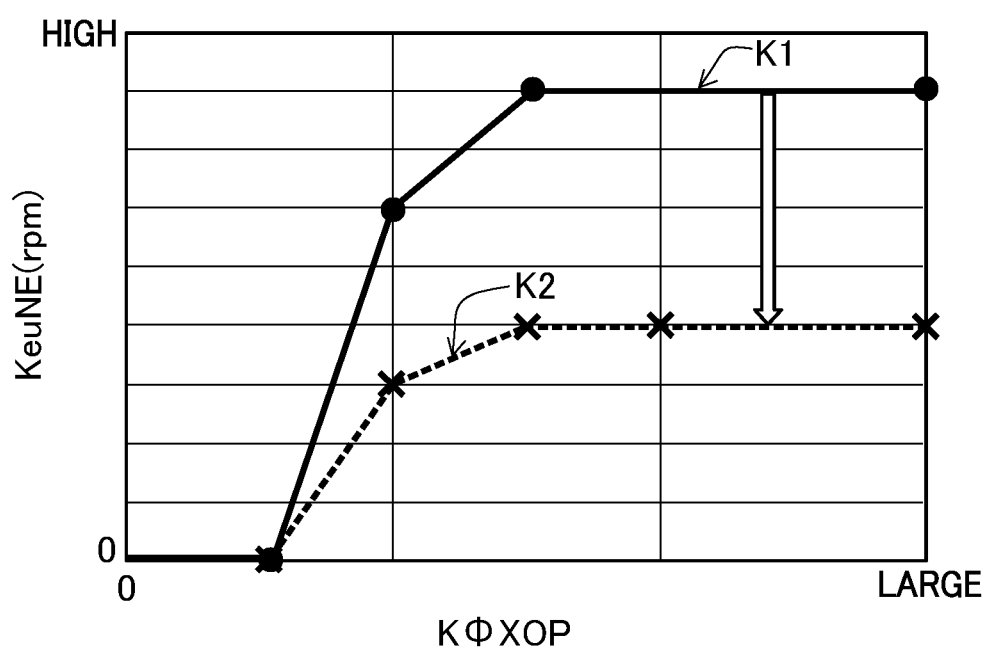
FIG. 8 is an idle up rotation number map referenced to obtain an idle up rotation number according to a diameter of the foreign-matter lodging in the first embodiment.
Figure 9:
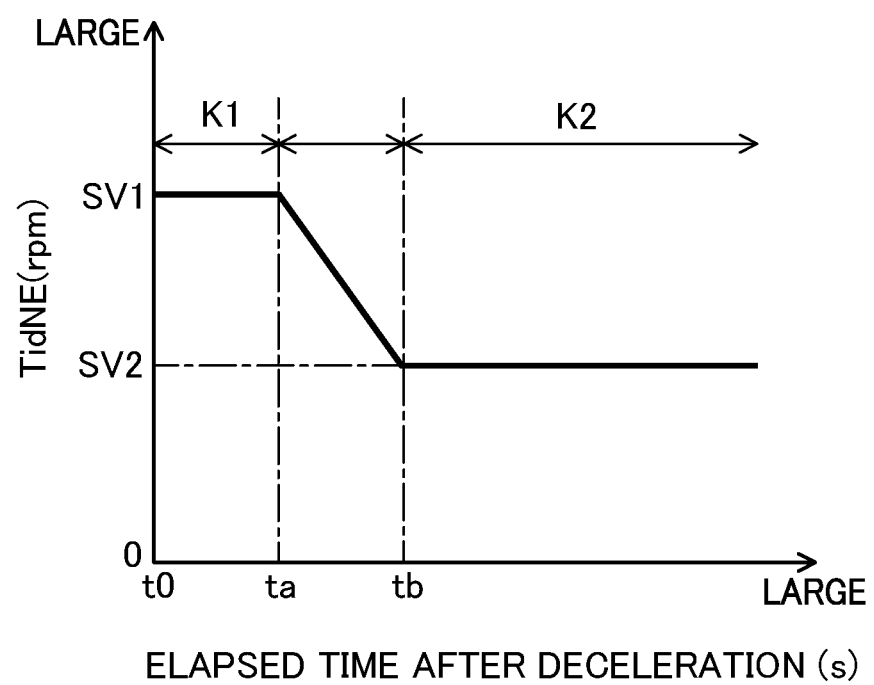
FIG. 9 is a graph showing a change in a target idle rotation number according to an elapsed time after the deceleration in the first embodiment.

Next, in step 430, the ECU 50 calculates a target idle rotation number TidNE according to the diameter of foreign-matter lodging KΦXOP. That is, the ECU 50 obtains the target idle rotation number TidNE by adding an idle up rotation number KeuNE according to the diameter of foreign-matter lodging KΦXOP to a predetermined basic idle rotation number KidNE (fixed value). Here, the ECU 50 can obtain the idle up rotation number KeuNE according to the diameter of foreign-matter lodging KΦXOP by referring to the idle up rotation number map as shown in FIG. 8. In FIG. 8, a solid line (thick line) indicates a first increase value K1 for avoiding the engine stall, and a broken line indicates a second increase value K2 for maintaining the idle or improving the deceleration performance. Further, as shown by the graph in FIG. 9, the ECU 50 changes the target idle rotation number TidNE according to the elapsed time since deceleration after determination of the deceleration. That is, as shown in FIG. 9, the ECU 50 sets the target idle rotation number TidNE to a predetermined first set value SV1 for avoiding the engine stall, from time t0 of the deceleration start to time ta when a predetermined time elapses, and shifts the target idle rotation number TidNE to a second set value SV2 lower than the first set value SV1 after a predetermined time has elapsed, that is, after time ta. Further, the ECU 50 keeps the first set value SV1 constant from time t0 of the deceleration start to time ta, keeps the second set value SV2 constant after time tb (tb>ta), and reduces the first set value SV1 to the second set value SV2 from time ta to time tb. Here, the ECU 50 obtains the first set value SV1 based on the first increase value K1 and obtains the second set value SV2 based on the second increase value K2. The above-described times ta and tb can be set to any values.

Here, the first set value SV1 is a set value that can sufficiently avoid the engine stall, but it is set so as not to limit the deceleration of the engine 1 more than necessary. Further, the second set value SV2 is a set value for maintaining the idle or improving the deceleration performance, and is also a set value capable of avoiding the engine stall. Further, the basic idle rotation number KidNE that configures the target idle rotation number TidNE (the first set value SV1 and the second set value SV2) is not a value that can avoid the engine stall by itself.

Next, in step 440, the ECU 50 determines whether the deceleration flag XDR is "0". As described later, the deceleration flag XDR is set to "1" when it is determined that the engine 1 is decelerated or idle, and is set to "0" when it is determined that the engine 1 is steady or accelerated. The ECU 50 shifts the process to step 450 if the determination result is affirmative and shifts the process to step 540 if the determination result is negative.

In step 450, the ECU 50 sets the deceleration flag XDR to "1" because the engine 1 is decelerated or idle.

Next, in step 460, the ECU 50 takes the engine rotation number NE based on the detected value of the rotation number sensor 52.

Next, in step 470, the ECU 50 determines whether the taken engine rotation number NE is higher than the target idle rotation number TidNE. The ECU 50 shifts the process to step 480 if the determination result is affirmative and shifts the process to step 500 if the determination result is negative.

In step 480, the ECU 50 calculates the difference in the target idle rotation number TidNE with respect to the actual engine rotation number NE as the rotation number difference ΔNE. In this case, the rotation number difference ΔNE becomes a positive value.

Next, in step 490, the ECU 50 controls the electronic throttle device 14 to be closed according to the rotation number difference ΔNE. That is, the ECU 50 controls the electronic throttle device 14 to be closed in order to reduce the engine rotation number NE to the target idle rotation number TidNE. Thereafter, the ECU 50 returns the process to step 400.

On the other hand, in step 500, the ECU 50 calculates the difference in the target idle rotation number TidNE with respect to the actual engine rotation number NE as the rotation number difference ΔNE. In this case, the rotation number difference ΔNE becomes a negative value.

Next, in step 510, the ECU 50 controls the electronic throttle device 14 to be opened according to the rotation number difference ΔNE. That is, the ECU 50 controls the electronic throttle device 14 to be opened in order to increase the engine rotation number NE to the target idle rotation number TidNE. Thereafter, the ECU 50 returns the process to step 400.

On the other hand, after being shifted from step 400, in step 520, the ECU 50 sets the deceleration flag XDR to "0" and shifts the process to step 460 because the engine 1 is steady or accelerated.

In addition, after being shifted from step 410, in step 530, the ECU 50 obtains the basic idle rotation number KidNE as the target idle rotation number TidNE and shifts the process to step 460. Since the target idle rotation number TidNE does not include the idle up rotation number KeuNE, the target idle rotation number TidNE is lower than the target idle rotation number TidNE when the foreign-matter lodging is present, and becomes a value that does not contribute to the idle up, that is, a value for releasing the idle up.

On the other hand, after being shifted from step 440, in step 540, the ECU 50 determines whether or not the engine 1 is in a fuel cut (F/C), that is, whether or not the fuel injection from the injector 25 is interrupted with the deceleration. The ECU 50 shifts the process to step 460 as it is if the determination result is affirmative and shifts the process to step 550 if the determination result is negative.

In step 550, the ECU 50 shifts the process to step 560 after waiting for the elapse of a predetermined time after returning from the fuel cut (F/C) to the fuel supply. The predetermined time is a waiting time until the rotation of the engine 1 is stabilized after returning from the fuel cut.

Figure 10:
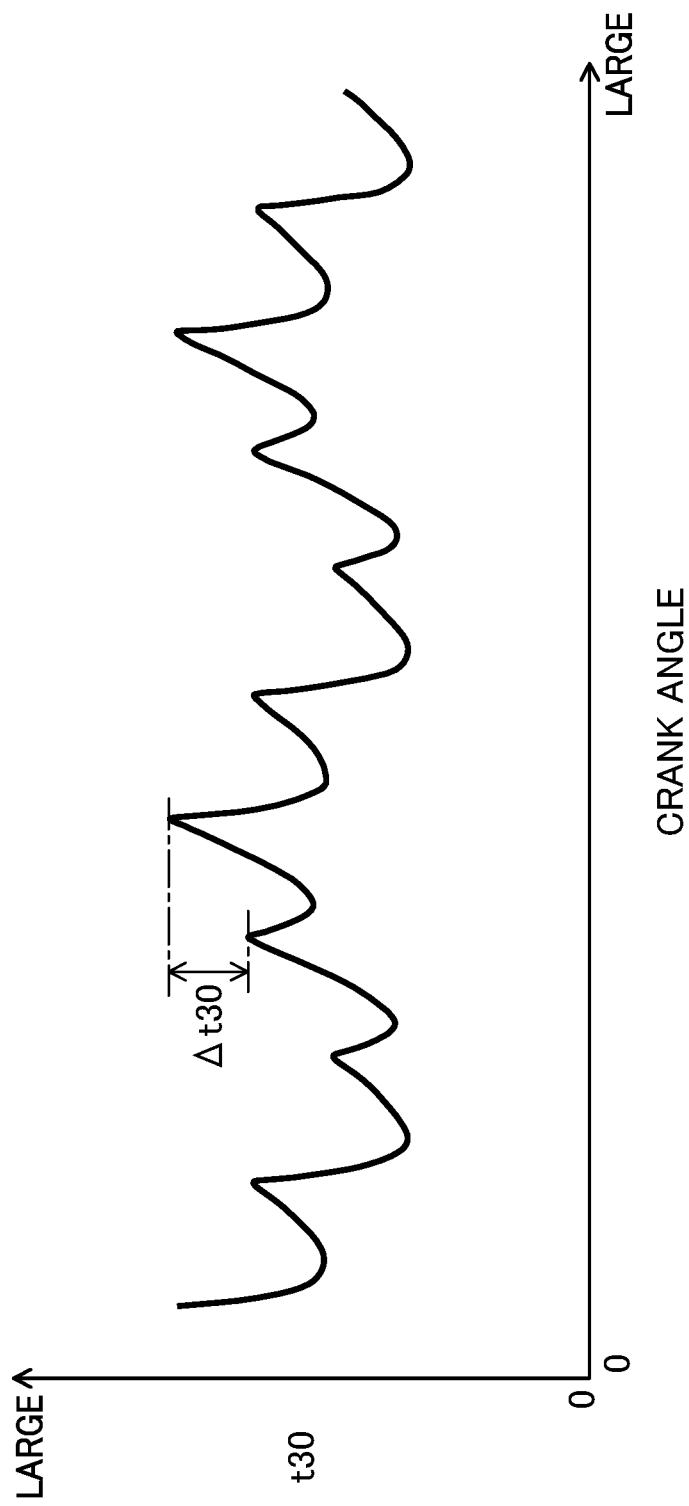
FIG. 10 is a graph showing a relationship between a 30° time (t30) taken for each advance of a crank angle by 30° and a 30°-time-difference ($\Delta$t30) in the first embodiment.

Next, in step 560, the ECU 50 takes a 30°-time-difference Δt30. Here, the 30°-time-difference Δt30 is a value detected by the rotation number sensor 52, and as shown by the graph in FIG. 10, a time (30° time t30) taken each time the crank angle advances by "30°" means the difference between the previous value and the current value. The ECU 50 separately calculates the 30° time t30 and the 30°-time-difference Δt30. Since this calculation method is well known, the description thereof is omitted.

Next, in step 570, the ECU 50 determines whether the 30°-time-difference Δt30 is smaller than a predetermined value B1. The ECU 50 shifts the process to step 580 if the determination result is affirmative and shifts the process to step 460 if the determination result is negative.

In step 580, the ECU 50 obtains the basic idle rotation number KidNE as the target idle rotation number TidNE and shifts the process to step 460. Since the target idle rotation number TidNE does not include the idle up rotation number KeuNE, the target idle rotation number TidNE does not contribute to the idle up, that is, a value for releasing the idle up.

According to the above-described idle up control during the deceleration, during deceleration of the engine 1, the ECU 50 performs the feedback control on the electronic throttle device 14 so that the detected engine rotation number NE becomes a predetermined target idle rotation number TidNE in order to avoid the engine stall, and performs the idle up control including setting the target idle rotation number TidNE to the predetermined first set value SV1 to avoid the engine stall from the deceleration start to the elapse of the predetermined time and shifting to the second set value SV2 lower than the first set value SV1 after the predetermined time elapses. Here, the ECU 50 is configured to diagnose an abnormality related to opening and closing between the valve seat 32 and the valve element 33 in the EGR valve 18 based on the detected operating state (intake pressure PM or the like), when it is determined that the abnormality occurs in the EGR valve 18, the diameter (diameter of foreign-matter lodging KΦXOP) of the foreign matter FB lodged between the valve seat 32 and the valve element 33 is calculated based on the detected intake pressure PM, and the first set value SV1 and the second set value SV2 related to the target idle rotation number TidNE are calculated based on the calculated diameter of the foreign matter FB.

Further, according to the idle up control during the deceleration, when the engine 1 is decelerated and fuel is supplied to the engine 1 by the injector 25 (not during the deceleration fuel cut), the ECU 50 determines the presence or absence of the misfire of the engine 1 based on the change (30°-time-difference Δt30) in the detected crank angular velocity (30° time t30) and releases the idle up control when it is determined that no misfire is present.

Figure 11:
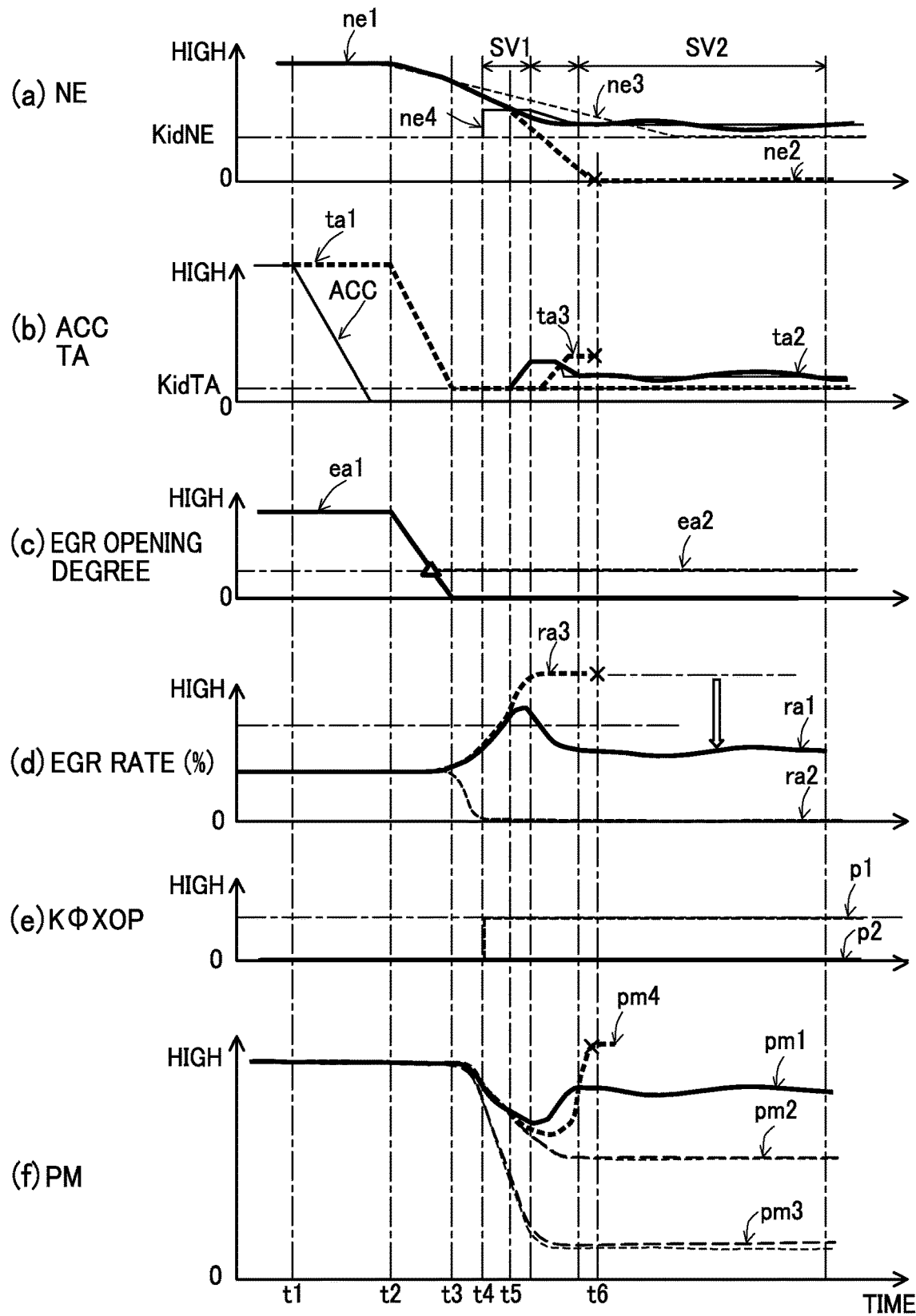
FIG. 11 shows time charts showing a behavior of various parameters at the time of performing the control of the idle up during the deceleration in the first embodiment.

Here, FIG. 11 shows time charts showing a behavior of various parameters at the time of executing the above-described idle up control during the deceleration. In FIG. 11, (a) shows the engine rotation number NE, (b) shows the accelerator opening degree ACC and the throttle opening degree TA, (c) shows the EGR opening degree, (d) shows an EGR rate, (e) shows the diameter of foreign-matter lodging KΦXOP, and (f) shows the intake pressure PM.

In FIG. 11(a), a thick line ne1 indicates the case where the idle up by this control is performed when foreign matters are lodged, a thick broken line ne2 indicates the case where the idle up by this control is not performed when foreign matters are lodged, a broken line ne3 indicates the case where the idle up by this control is not performed when foreign matters are not lodged, and a solid line ne4 indicates the target idle rotation number TidNE when foreign matters are lodged.

In FIG. 11(b), a solid line indicates the accelerator opening degree ACC, a thick broken line ta1 indicates the throttle opening degree in the case where the idle up by this control is not performed when foreign matters are not lodged, a thick line ta2 indicates the throttle opening degree in the case where the idle up by this control is performed when foreign matters are lodged, and a thick broken line ta3 indicates the throttle opening degree in the case where the idle up by this control is delayed.

In FIG. 11(c), a thick line ea1 indicates the case where the EGR valve 18 operates normally, and a broken line ea2 indicates the case where the foreign-matter lodging is present in the EGR valve 18.

In FIG. 11(d), a thick line ra1 indicates the case where the idle up by this control is performed when foreign matters are lodged, a broken line ra2 indicates the case where the idle up by this control is not performed when foreign matters are not lodged, and a thick broken line ra3 indicates the case where the idle up by this control is not performed when foreign matters are lodged.

In FIG. 11(e), a broken line p1 indicates the case where foreign matters are lodged, and a thick line p2 indicates the case where foreign matters are not lodged.

In FIG. 11(f), a thick line pm1 indicates the case where the idle up by this control is performed when foreign matters are lodged, a broken line pm2 indicates the case where the idle up by this control is not performed and the case where the engine stall does not occur when foreign matters are lodged, a broken line pm3 indicates the case where the idle up by this control is not performed when foreign matters are not lodged, and a thick broken line pm4 indicates the case where the idle up by this control is not performed when foreign matters are lodged.

In FIG. 11, when the accelerator opening degree ACC of (b) starts to be reduced at time t1 (the deceleration request is input), the throttle opening degree TA of (b) and the EGR opening degree of (c) start to be reduced at slightly-delayed time t2. That is, the electronic throttle device 14 and the EGR valve 18 each start to be closed. Thereafter, when the throttle opening degree TA of (b) reaches a predetermined deceleration opening degree (basic idle opening degree KidTA) at time t3 and the EGR opening degree of (c) is fully closed, but when the foreign matters are lodged in the EGR valve 18 immediately before time t3 (triangular mark), as indicated by a broken line ea2 in (c), the EGR opening degree is not fully closed and remains open at a certain opening degree.

Thereafter, when it is determined that the foreign-matter lodging is present in the EGR valve 18 at time t4 as indicated by the broken line p1 in (e), the idle up is executed by this control, and the target idle rotation number TidNE becomes the first set value SV1 as indicated by the solid line ne4 in (a). Thereby, when the actual engine rotation number NE exceeds the target idle rotation number TidNE at time t5 as indicated by the thick line ne1 in (a), the throttle opening degree TA after that is controlled as indicated by the thick line ta2 in (b), and the engine rotation number NE is controlled to converge to the target idle rotation number TidNE as indicated by the thick line ne1 in (a). As a result, as indicated by the thick line pm1 in (f), the intake pressure PM which starts to be reduced after time t3 is increased by the idle up and then becomes substantially constant. As a result, as indicated by the thick line ra1 in (d), the EGR rate which is once increased after time t3 is reduced by the idle up and then becomes substantially constant. As described above, since the increase in the EGR rate is suppressed when the engine 1 is decelerated, the engine stall of the engine 1 can be avoided.

On the other hand, when the idle up to the target idle rotation number TidNE is not performed after time t4, as indicated by the thick broken line ra3 in FIG. 11(d), the EGR rate is increased to the maximum after that, and as indicated by the thick broken line pm4 in (f), the intake pressure PM is converted from the reduction to the increase after that, and as indicated by the thick broken line ne2 in (a), the engine rotation number NE becomes "0" at time t6 and the engine leads to the engine stall as shown by the cross mark. Further, as shown by the thick broken line ta3 in FIG. 11(b), even when the idle up to the target idle opening degree TidTA is delayed, the intake pressure PM and the EGR rate is similarly changed (increased) after time t4, and the engine leads to the engine stall.

According to the engine system in the present embodiment described above, when the engine 1 is decelerated, in order to avoid the engine stall, the electronic throttle device 14 is subjected to the feedback control so that the detected engine rotation number NE becomes the predetermined target idle rotation number TidNE. Here, the target idle rotation number TidNE becomes the predetermined first set value SV1 for avoiding the engine stall until the predetermined time elapses from the start of the deceleration. Therefore, for example, even if the EGR valve 18 is not fully closed due to the foreign matter FB lodged or the like and the EGR gas leaks to the intake air, the engine 1 idles-up to the first set value SV1 for avoiding the engine stall, thus the engine stall being prevented. In addition, when a predetermined time has elapsed after the target idle rotation number TidNE becomes the first set value SV1, the target idle rotation number TidNE shifts to the second set value SV2 lower than the first set value SV1, such that the level of the idle up is reduced by one step. For this reason, when the EGR valve 18 is not fully closed due to the foreign matters lodged or the like during the deceleration of the engine 1, it is possible to avoid the delay in the increase of the intake air due to the idle up in the initial stage of the deceleration and to avoid the engine stall.

According to the configuration of the present embodiment, by performing the predetermined diagnostic control of foreign matters lodged, the abnormality related to the opening and closing between the valve seat 32 and the valve element 33 in the EGR valve 18 is diagnosed based on the operating state of the engine 1 (lodging abnormality of the foreign matter FB). Then, when it is determined that the abnormality occurs, the diameter (diameter of foreign-matter lodging KΦXOP) of the foreign matter FB lodged between the valve seat 32 and the valve element 33 is calculated based on the detected intake pressure PM, and the first set value SV1 related to the target idle rotation number TidNE is calculated based on the diameter of the foreign matter FB. Therefore, when the foreign matter FB lodged is present in the EGR valve 18 and the EGR gas actually leaks to the intake air, the target idle rotation number TidNE becomes the first set value SV1 according to the diameter of foreign matter FB at the initial stage of the deceleration, so that the engine 1 necessarily and sufficiently idles-up for avoiding the engine stall. For this reason, in the initial stage of the deceleration of the engine 1, it is possible to prevent the deterioration of the deceleration performance while avoiding the engine stall.

Further, according to the configuration of the present embodiment, when it is determined that the abnormality occurs in the EGR valve 18 as described above, the second set value SV2 related to the target idle rotation number TidNE is calculated based on the diameter of the foreign matter FB (diameter of foreign-matter lodging KΦXOP). Therefore, when the foreign matter FB lodged is present in the EGR valve 18 and the EGR gas actually leaks to the intake air, the target idle rotation number TidNE becomes the first set value SV1 and then shifts to the second set value SV2 corresponding to the diameter of the foreign matter FB, so that the idle up is reduced to the necessary and sufficient level by one step. For this reason, in the middle and late stages of the deceleration of the engine 1, it is possible to prevent the occurrence of idle-running feeling of the engine 1 (uneasy feeling of the driver that the engine does not decelerate as requested) while avoiding the engine stall.

In the present embodiment, as the abnormality related to the opening and closing of the EGR valve 18, the fully closed abnormality due to the foreign matter FB lodged is assumed, but not limited to the foreign matter FB lodged, the abnormality that the valve element 33 is not fully closed due to sticking or the like can also be assumed.

Further, in the configuration of the present embodiment, for example, when it is determined that the EGR valve 18 has the abnormality by the removal control of foreign matters shown in FIG. 6, the valve element 33 is opened at the opening degree larger than the opening degree according to the diameter of the foreign matter FB is made at the time of the fuel cut, and the foreign matter FB lodged between the valve seat 32 and the valve element 33 can be removed. Therefore, the EGR valve 18 can promptly return from the foreign-matter lodging abnormality to the normal state, and in this sense, the occurrence of the misfire or the engine stall of the engine 1 can be avoided.

Furthermore, according to the configuration of the present embodiment, when the engine 1 is decelerated and fuel is supplied to the engine 1 by the injector 25 (when fuel is not cut), the engine 1 burns the fuel, but it is determined whether there is the misfire in the engine 1 based on the change (30°-time-difference Δt30) of the detected crank angular velocity (30° time t30). When it is determined that there is no misfire, the idle up control is released. Therefore, when the engine 1 is not likely to be in the engine stall, the unnecessary idle up control is not performed. For this reason, when the engine 1 is not likely to be in the engine stall, it is possible to quickly return to normal idle control during the deceleration, and it is possible to suppress a sudden feeling (dash-out feeling) of the change in the engine rotation number NE due to the idle up.

Second Embodiment

Next, a second embodiment in which an engine system is embodied in a gasoline engine system will be described in detail with reference to the accompanying drawings.

In the following description, constituent elements equivalent to those in the first embodiment are given the same reference numerals and explanation thereof is omitted, and different points will be mainly described.

Figure 12:
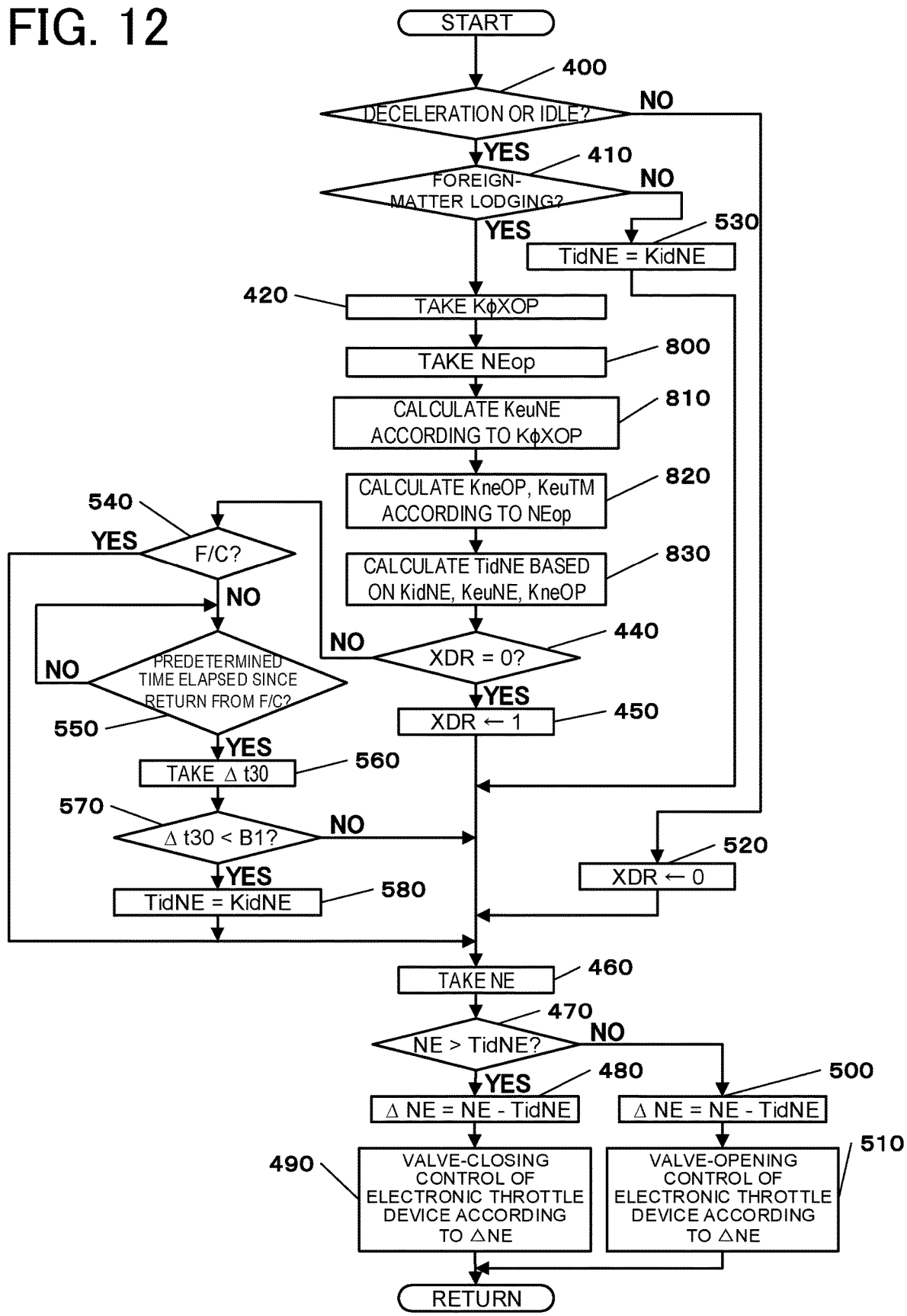
FIG. 12 is a flowchart showing a content of a control of an idle up during deceleration in a second embodiment.

The present embodiment differs from the first embodiment in the content of an idle up control during deceleration. FIG. 12 shows a flowchart showing this control content. A flowchart of FIG. 12 differs from that of FIG. 7 in that processes of steps 800 to 830 are provided instead of step 430 of the flowchart of FIG. 7.

(Idle Up Control During Deceleration)

In this routine, an ECU 50 performs the following processes between step 420 and step 440. That is, in step 800, the ECU 50 takes an engine rotation number NE at the time of a foreign-matter lodging determination as an engine rotation number NEop at the time of determination.

Next, in step 810, the ECU 50 calculates an idle up rotation number KeuNE according to a diameter of foreign-matter lodging KΦXOP. The ECU 50 can obtain the idle up rotation number KeuNE (a first increase value K1 and a second increase value K2) according to the diameter of foreign-matter lodging KΦXOP by referring to an idle up rotation number map as shown in FIG. 8.

Figure 13:
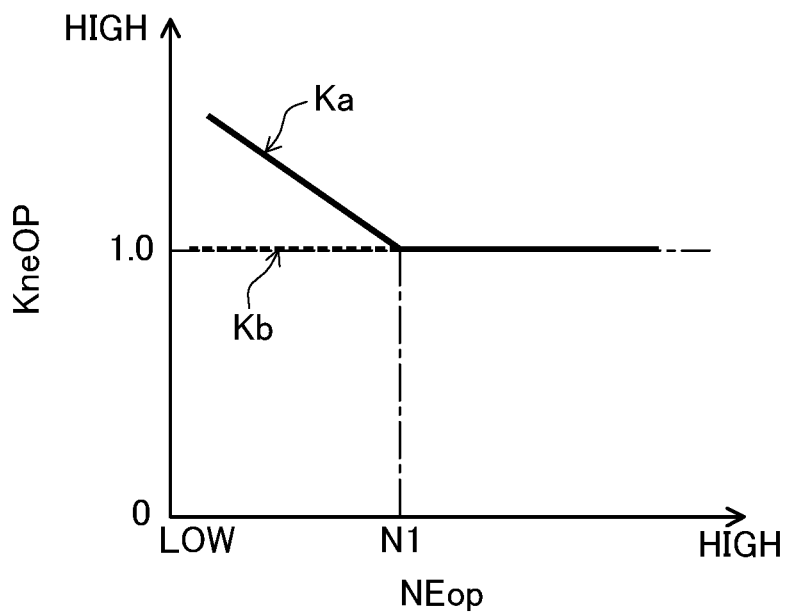
FIG. 13 is an idle up correction coefficient map referenced to obtain an idle up correction coefficient according to an engine rotation number at the time of determination in the second embodiment.
Figure 14:
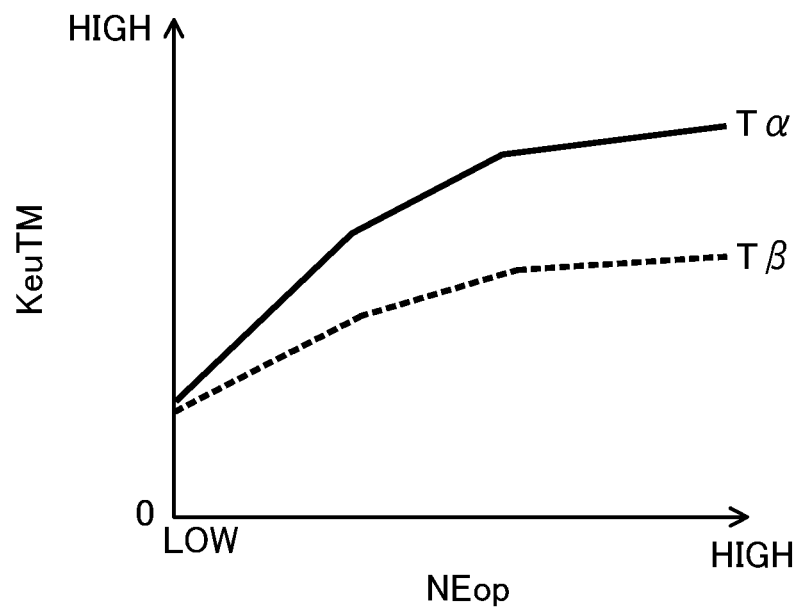
FIG. 14 is an idle up holding time map referenced to obtain an idle up holding time according to the engine rotation number at the time of determination in the second embodiment.

Next, in step 820, the ECU 50 calculates an idle up correction coefficient KneOP and an idle up holding time KeuTM according to the engine rotation number NEop at the time of determination. Here, the ECU 50 can obtain the idle up correction coefficient KneOP according to the engine rotation number NEop at the time the determination by referring to the idle up correction coefficient map as shown in FIG. 13. In FIG. 13, a solid line (thick line) indicates a first correction coefficient Ka for avoiding an engine stall and is used to correct a first set value SV1. The first correction coefficient Ka is set to be higher than "1.0" as the engine rotation number NEop is lower than the predetermined value N1 at the time the determination, and set to be "1.0" at a predetermined value N1 or more. In addition, a broken line indicates a second correction coefficient Kb for maintaining idle or improving deceleration performance and is used to correct a second set value SV2. In addition, the ECU 50 can obtain the idle up holding time KeuTM according to the engine rotation number NEop at the time of determination by referring to the idle up holding time map as shown in FIG. 14. In FIG. 14, a solid line (thick line) indicates a first holding time Tα, which means time (time to hold the first set value SV1) from time t0 to time ta in FIG. 9. In addition, a broken line indicates a second holding time Tβ, which means time (shift time from the first set value SV1 to the second set value SV2) from time ta to time tb in FIG. 9. In the present embodiment, the holding times Tα and Tβ are set to be increased as the engine rotation number NEop is increased at the time of determination.

Next, in step 830, the ECU 50 calculates a target idle rotation number TidNE based on a basic idle rotation number KidNE, the idle up rotation number KeuNE, and the idle up correction coefficient KneOP. That is, as shown in the following Equation 1, the ECU 50 obtains the target idle rotation number TidNE by adding a multiplied result of the idle up rotation number KeuNE according to the diameter of foreign-matter lodging KΦXOP with the idle up correction coefficient KneOP according to the engine rotation number NEop at the time of determination to a predetermined basic idle rotation number KidNE (fixed value).

$$TidNE = KidNE + KeuNE * KneOP \quad \text{(Equation 1)}$$

Here, in the target idle rotation number TidNE, the first set value SV1 (see FIG. 9) for avoiding the engine stall and the second set value SV2 (see FIG. 9) for maintaining the idle or improving the deceleration performance can be obtained by the following Equations 2 and 3 respectively.

$$SV1 = KidNE + K1 * Ka \quad \text{(Equation 2)}$$

$$SV2 = KidNE + K2 * Kb \quad \text{(Equation 3)}$$

According to the idle up control during the deceleration described above, the ECU 50 includes the following configuration in addition to the configuration of the idle up control during the deceleration of the first embodiment. That is, when the engine rotation number (engine rotation number NEop at the time of determination) detected when it is determined that the abnormality related to the opening and closing in the EGR valve 18 occurs is lower than the predetermined value N1, the ECU 50 corrects the first set value SV1 to be higher than the case where the engine rotation number is higher than the predetermined value N1. Further, when the engine rotation number NEop at the time of determination is higher than the predetermined value, the ECU 50 corrects the time (first holding time Tα) to hold the target idle rotation number TidNE at the first set value SV1 and the time (second holding time Tβ) to shift the target idle rotation number TidNE from the first set value SV1 to the second set value SV2, respectively, to be longer.

Figure 15:
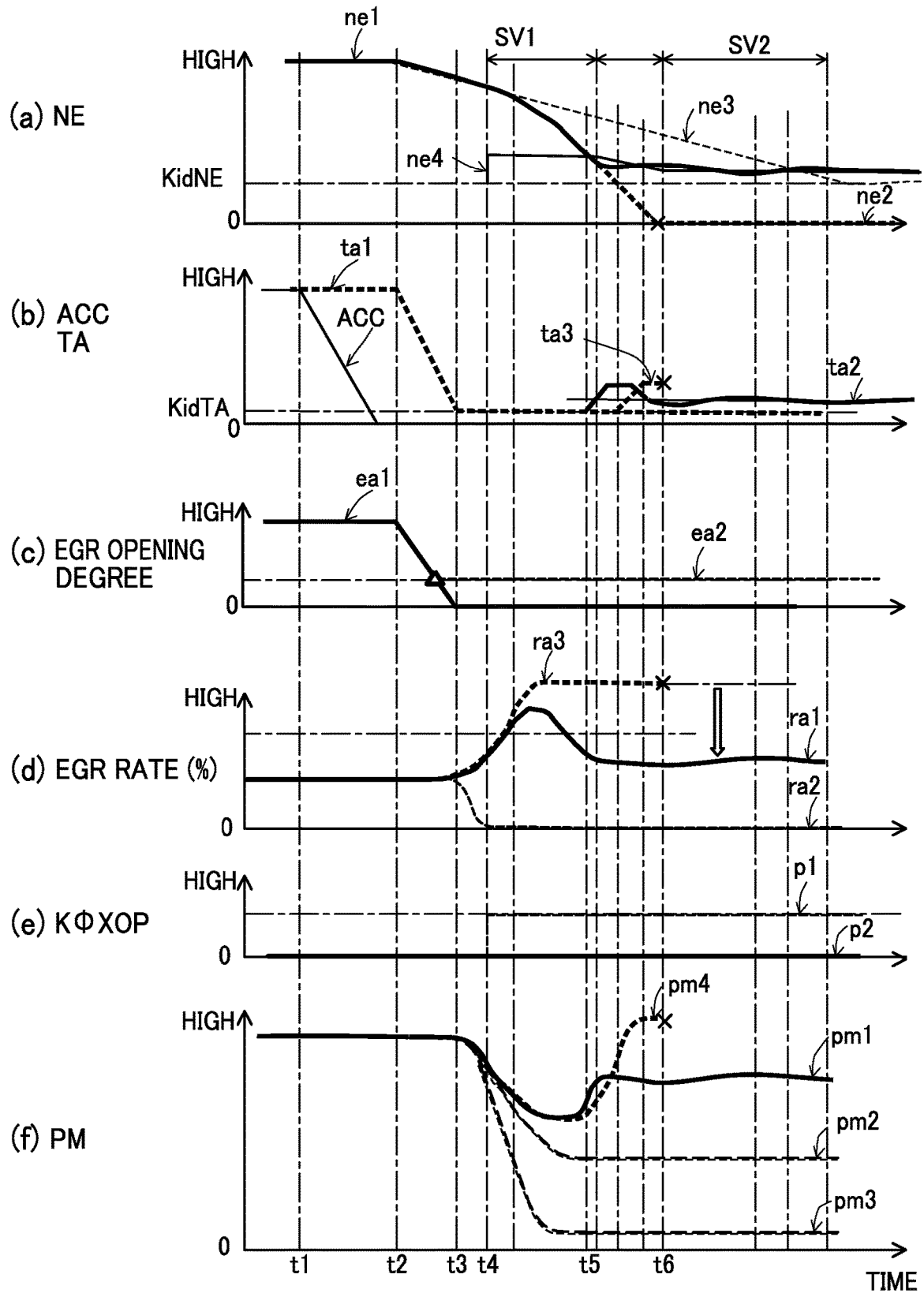
FIG. 15 shows time charts showing a behavior of various parameters at the time of performing the control of the idle up during deceleration in the second embodiment.

Here, FIG. 15 shows time charts showing a behavior of various parameters at the time of executing the above-described idle up control during the deceleration. Various parameters in FIG. 15(a) to (f) conform to those in FIG. 11. Further, various lines ne1 to ne4, ta1 to ta3, ea1, ea2, ra1 to ra3, p1, p2, and pm1 to pm4 in FIG. 15(a) to (f) are the same as those in FIG. 11. In FIG. 15, it is assumed that the engine rotation number NE immediately before the deceleration is higher than that in the case of FIG. 11.

Therefore, when it is determined that the foreign-matter lodging is present in the EGR valve 18 at time t4 as indicated by the broken line p1 in FIG. 15(e), the idle up is executed by this control, and the target idle rotation number TidNE becomes the first set value SV1 as indicated by the solid line ne4 in (a). Thereby, when the actual engine rotation number NE exceeds the target idle rotation number TidNE at time t5 as indicated by the thick line ne1 in (a), the throttle opening degree TA after that is controlled as shown by the thick line ta2 in (b), and the engine rotation number NE is controlled to converge to the target idle rotation number TidNE as indicated by the thick line ne1 in (a). Here, since the engine rotation number NE immediately before the deceleration is relatively large, it takes longer time than in the case of FIG. 11 from the determination time (time t4) of foreign-matter lodging to time t5 when the engine rotation number NE exceeds the target idle rotation number TidNE (first set value SV1). However, in the present embodiment, since the first holding time Tα for holding the target idle rotation number TidNE at the high first set value SV1 is corrected to be relatively long, the engine rotation number NE can be controlled to be the first set value SV1 even after being delayed from time t4. As a result, as indicated by the thick line pm1 in (f), the intake pressure PM which starts to be reduced after time t3 is increased by the idle up and then becomes substantially constant. As a result, as indicated by the thick line ra1 in (d), the EGR rate which is once increased after time t3 is reduced due to the idle up and then becomes substantially constant. As described above, even if the engine rotation number NE immediately before the deceleration is relatively large, when the engine 1 is decelerated, the idle up is performed with slight delay, the increase in the EGR rate is suppressed, and thus the engine stall of the engine 1 can be avoided.

Therefore, according to the configuration of the present embodiment, unlike the operations and effects of the first embodiment, the following operations and effects can be obtained. That is, when the engine rotation number NEop at the time of determination is higher than the predetermined value when it is determined that the EGR valve 18 becomes abnormal due to the foreign-matter lodging, a first holding time Tα to hold the target idle rotation number TidNE at the first set value SV1 and then a second holding time Tβ until the shift from the first set value SV1 to the second set value SV2 are each corrected to be long. Therefore, even if it takes time for the engine 1 to start deceleration from the large rotation number and to be decelerated up to the idle region, the engine 1 reliably idles-up by the high first set value SV1. For this reason, even if it takes time for the engine 1 to be decelerated from a large rotation number, it is possible to reliably avoid the engine stall by the idle up.

According to the configuration of the present embodiment, the first set value SV1 of the target idle rotation number TidNE is corrected to be higher when the engine rotation number NEop at the time of determination is lower than the predetermined value N1 when it is determined that the EGR valve 18 becomes abnormal due to foreign matters lodged. Therefore, the engine 1 reliably idles-up even from the small rotation number. For this reason, even if it takes time for the engine 1 to be decelerated from a small rotation number, it is possible to reliably avoid the engine stall by the idle up.

Third Embodiment

Next, a third embodiment in which an engine system is embodied in a gasoline engine system will be described in detail with reference to the accompanying drawings.

Figure 16:
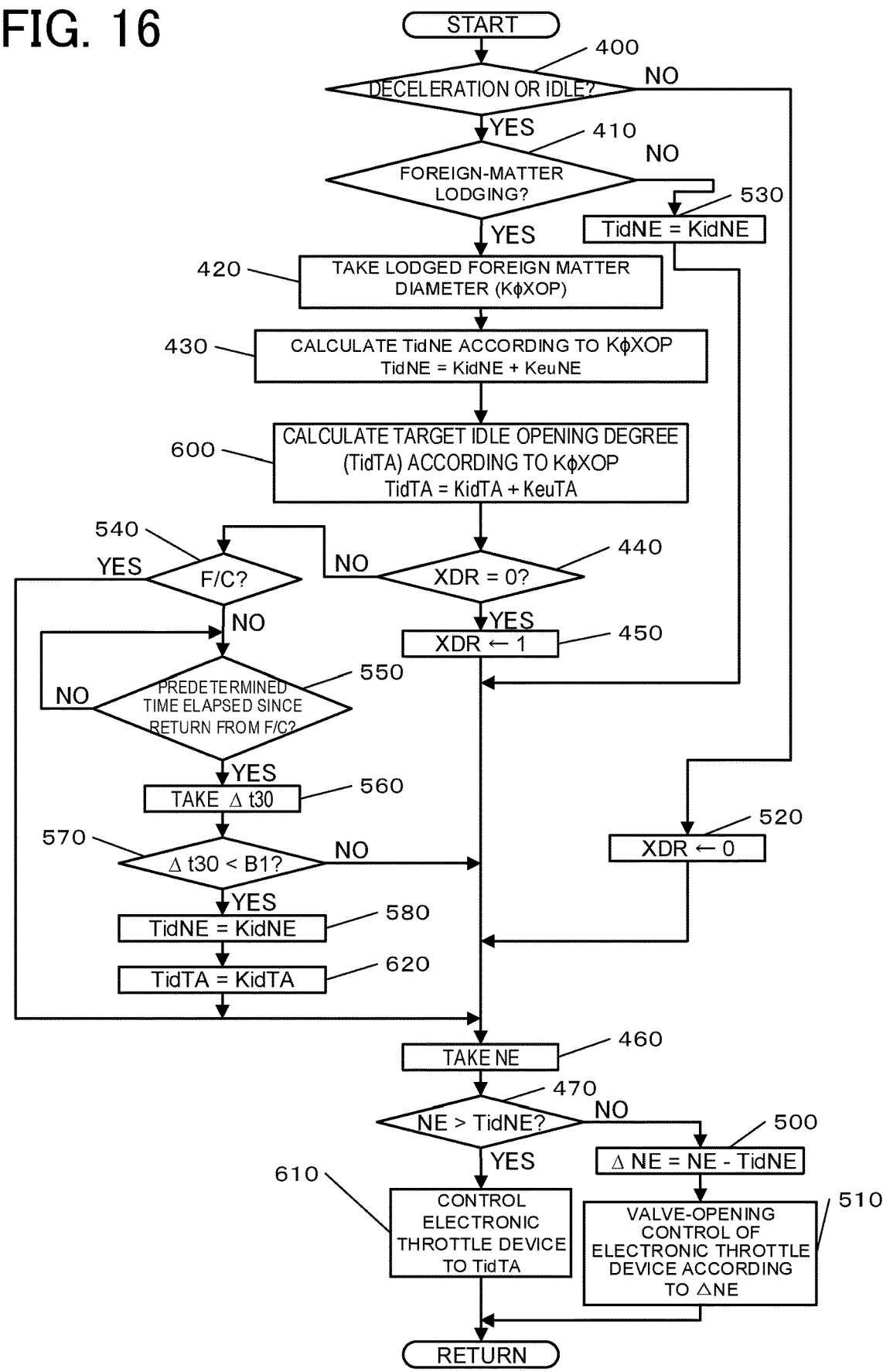
FIG. 16 is a flowchart showing a content of a control of an idle up during deceleration in a third embodiment.

The present embodiment differs from the first embodiment in the content of an idle up control during deceleration. FIG. 16 shows a flowchart showing this control content. The flowchart of FIG. 16 differs from that of FIG. 7 in that processing of step 600 is added between steps 430 and 440 of the flowchart of FIG. 7, processing of step 610 is provided instead of steps 480 and 490 of FIG. 7, and processing of step 620 is added after step 580.

(Idle Up Control During Deceleration)

Figure 17:
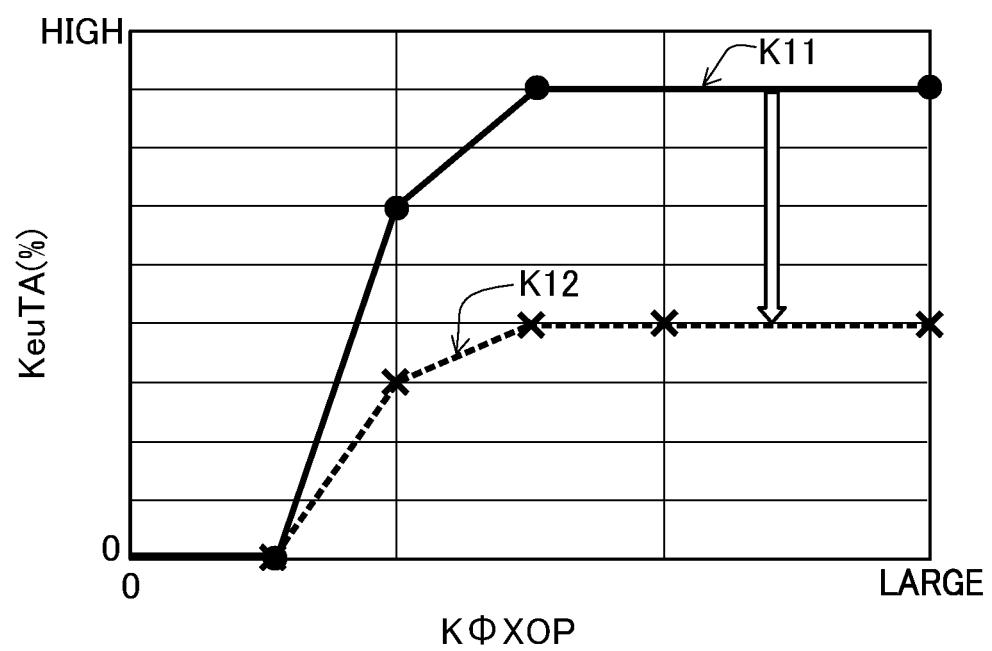
FIG. 17 is an idle up opening degree map referenced to obtain an idle up opening degree according to a diameter of the foreign-matter lodging in the third embodiment.
Figure 18:
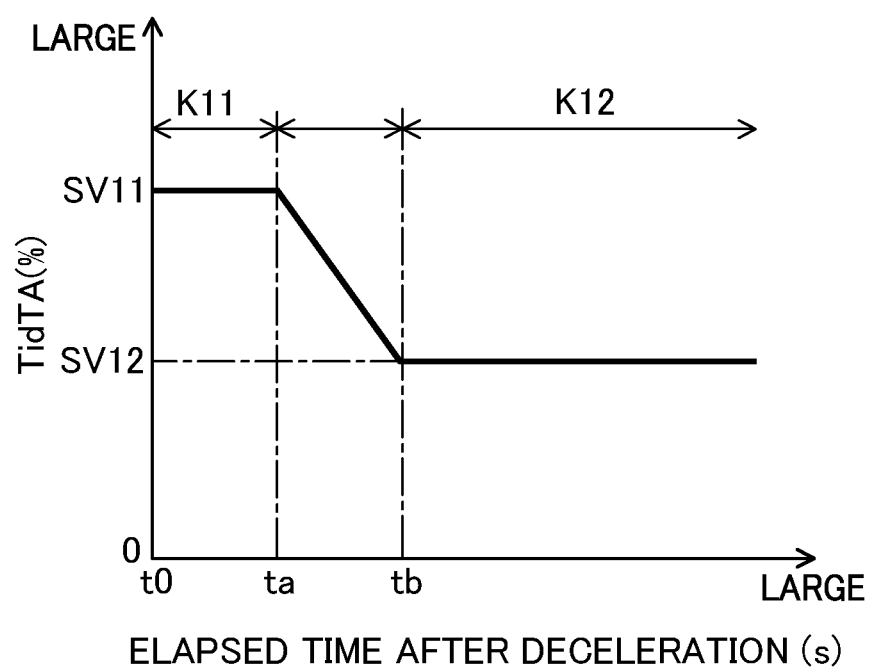
FIG. 18 is a graph showing a change in a target idle opening degree according to an elapsed time after the deceleration in the third embodiment.

In this routine, the ECU 50 shifts from step 430 and in step 600 and calculates a target idle opening degree TidTA according to a diameter of foreign-matter lodging KΦXOP. That is, the ECU 50 obtains the target idle opening degree TidTA by adding an idle up opening degree KeuTA according to the diameter of foreign-matter lodging KΦXOP to a predetermined basic idle opening degree KidTA (fixed value). Here, the ECU 50 can obtain the idle up opening degree KeuTA according to the diameter of foreign-matter lodging KΦXOP by referring to an idle up opening degree map as shown in FIG. 17. In FIG. 17, a solid line (thick line) indicates a first increase value K11 for avoiding the engine stall, and a broken line indicates a second increase value K12 for maintaining the idle or improving the deceleration performance. Further, as shown by the graph in FIG. 18, the ECU 50 changes a target idle opening degree TidTA according to the elapsed time since the deceleration after determination of the deceleration. That is, as shown in FIG. 18, the ECU 50 sets the target idle opening degree TidTA to a predetermined first set value SV11 for avoiding the engine stall, from time t0 of the deceleration start to time ta when a predetermined time elapses, and shifts the target idle opening degree TidTA toward a second set value SV12 lower than the first set value SV11 after a predetermined time has elapsed, that is, after time ta. Further, the ECU 50 keeps the first set value SV11 constant from time t0 of the deceleration start to time ta, and keeps the second set value SV12 constant after time tb (tb>ta), and reduces the first set value SV11 to the second set value SV12 from time ta to time tb. Here, the ECU 50 obtains the first set value SV11 based on the first increase value K11 and obtains the second set value SV12 based on the second increase value K12. The above-described times ta and tb can be set to any values.

Here, the first set value SV11 is a set value that can sufficiently avoid the engine stall, but it is set so as not to limit the deceleration of the engine 1 more than necessary. Further, the second set value SV12 is a set value for maintaining the idle or improving the deceleration performance, and is also a set value capable of avoiding the engine stall. Further, the basic idle opening degree KidTA that configures the target idle opening degree TidTA (the first set value SV11 and the second set value SV12) is not a value that can reliably avoid the engine stall by itself.

On the other hand, after being shifted from step 470, in step 610, the ECU 50 returns the process to step 400 after controlling the electronic throttle device 14 to the target idle opening degree TidTA.

In addition, after being shifted from step 580, in step 620, the ECU 50 obtains the basic idle opening degree KidTA as the target idle opening degree TidTA and shifts the process to step 460. Since the target idle opening degree TidTA does not include the idle up opening degree KeuTA, the target idle opening degree TidTA is lower than the target idle opening degree TidTA in the fuel cut and becomes a value that does not contribute to the idle up, that is, a value for releasing the idle up.

According to the above-described idle up control during the deceleration, unlike the first embodiment, the ECU 50 is configured to diagnose abnormality related to opening and closing between a valve seat 32 and a valve element 33 in the EGR valve 18 based on a detected operating state of the engine 1, controls the electronic throttle device 14 to be forcibly opened at a predetermined opening degree (target idle opening degree TidTA) when it is determined that the abnormality occurs, and releases the opening valve control when the detected engine rotation number NE reaches a predetermined target idle rotation number TidNE.

Figure 19:
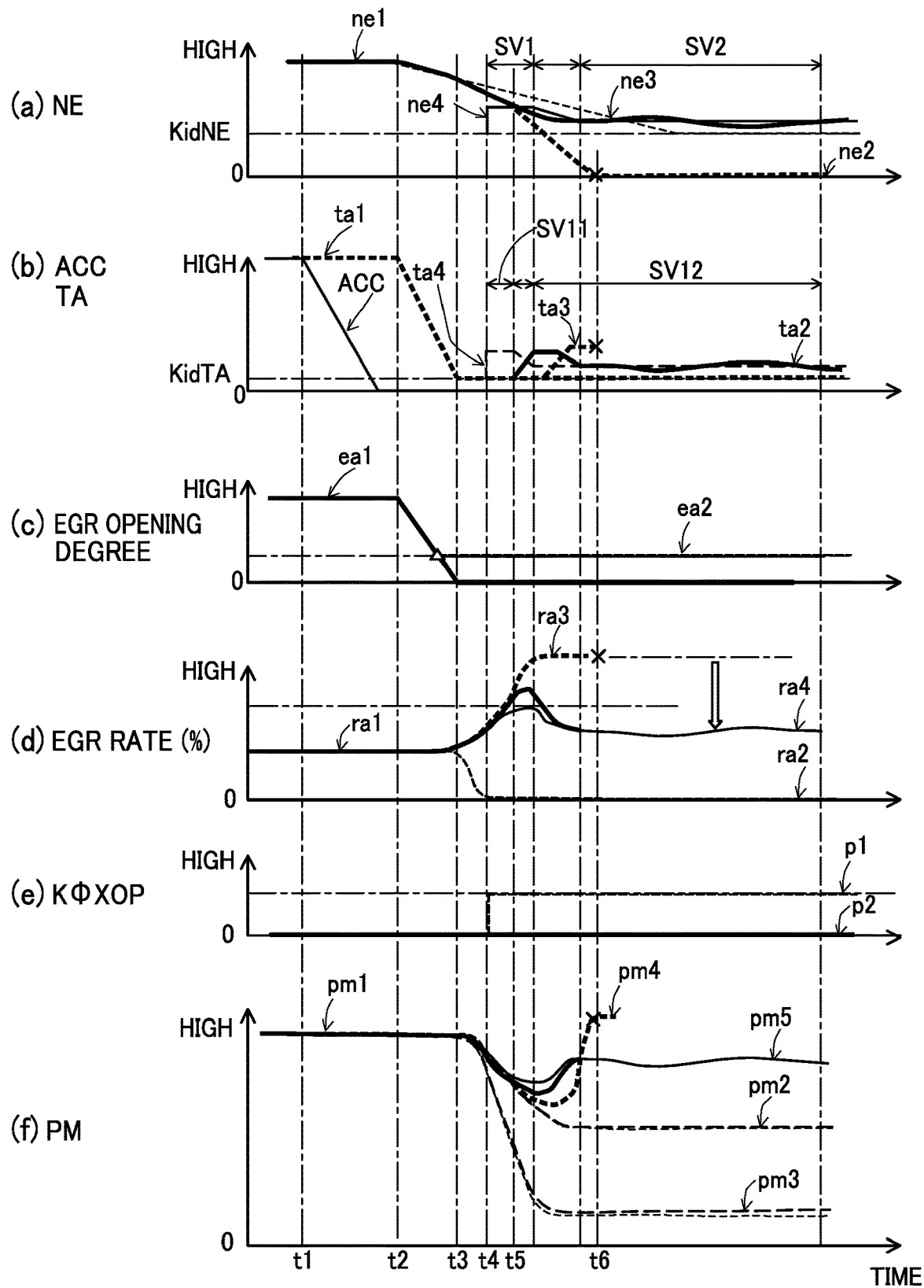
FIG. 19 shows time charts showing a behavior of various parameters at the time of performing the control of the idle up during the deceleration in the third embodiment.

Here, FIG. 19 shows time charts showing a behavior of various parameters at the time of executing the above-described idle up control during the deceleration. Various parameters in FIG. 19(a) to (f) conform to those in FIG. 11. Further, various lines ne1 to ne4, ta1 to ta3, ea1, ea2, ra1 to ra3, p1, p2, and pm1 to pm4 in FIGS. 19(a) to (f) are the same as those in FIG. 11. FIG. 19 differs from FIG. 11 in that the target idle opening degree TidTA indicated by a broken line ta4 in (b) is added and a solid line ra4 and a solid line pm5 are added in (d) and (f), respectively. The solid lines ra4 and solid lines pm5 in FIGS. 19(d) and (f) each show the case where the idle up by the target idle opening degree TidTA is performed when foreign matters are lodged.

Therefore, unlike FIG. 11, in FIG. 19, when it is determined that foreign matters are lodged in the EGR valve 18 at time t4 as shown by the broken line p1 in (e), as shown by the broken line ta4 in (b), the throttle opening degree TA is immediately controlled to the target idle opening degree TidTA, and the idle up is performed. As a result, as indicated by the solid line pm5 in (f), the intake pressure PM which starts to be reduced after time t3 is early increased by the idle up and then becomes substantially constant. As a result, as indicated by the solid line ra4 in (d), the EGR rate which is once increased after time t3 is quickly suppressed its increase due to the idle up and then becomes substantially constant. As described above, since the increase in the EGR rate is quickly suppressed from the initial stage of the deceleration of the engine 1, the engine stall of the engine 1 can be reliably avoided.

Therefore, according to the configuration of the present embodiment, unlike the operations and effects of the first embodiment, the following operations and effects can be obtained. That is, the abnormality related to the opening and closing between the valve seat 32 and the valve element 33 in the EGR valve 18 is diagnosed based on the detected operating state of the engine 1. When it is determined that the abnormality occurs, the electronic throttle device 14 is forcibly controlled to be opened at a predetermined opening degree (target idle opening degree TidTA). Therefore, when foreign matters are lodged in the EGR valve 18 and the EGR gas actually leaks to the intake air, the electronic throttle device 14 is forcibly opened to a predetermined opening degree (target idle opening degree TidTA) in preference to the feedback control by the target idle rotation number TidNE and the engine 1 quickly idles-up in order to avoid the engine stall. Thereafter, when the detected engine rotation number NE reaches the target idle rotation number TidNE, the forced valve opening control is released and the idle up is promptly released. For this reason, when the EGR valve 18 is not fully closed due to the foreign matters lodged or the like during the deceleration of the engine 1, it is possible to reliably avoid the delay in the increase of the intake air due to the idle up in the initial stage of the deceleration and to more reliably avoid the engine stall.

Fourth Embodiment

Next, a fourth embodiment in which an engine system is embodied in a gasoline engine system will be described in detail with reference to the accompanying drawings.

Figure 20:
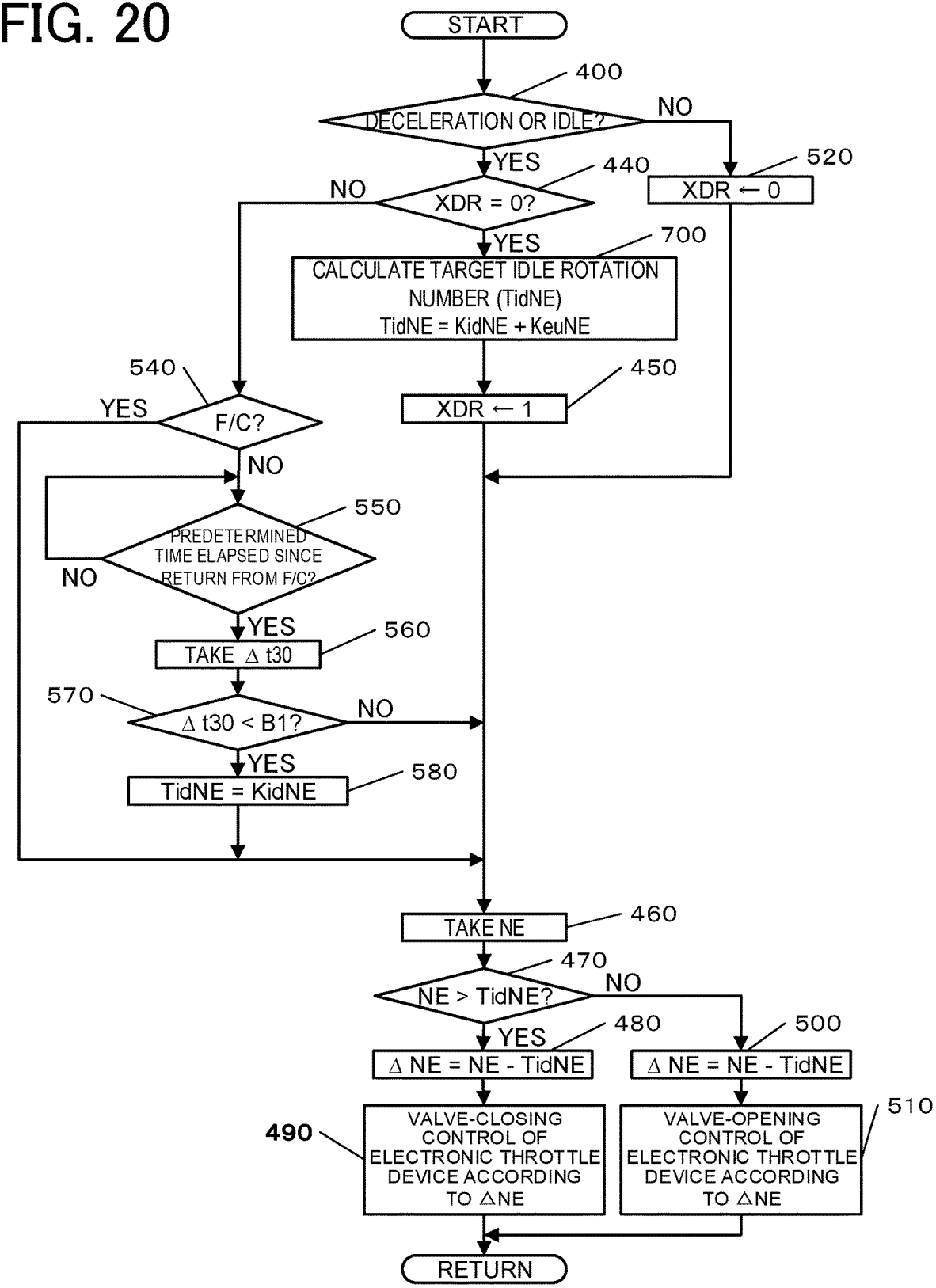
FIG. 20 is a flowchart showing a content of a control of an idle up during deceleration in a fourth embodiment.

A configuration of the present embodiment differs from the configurations of each embodiment in that the diagnostic control of foreign matters lodged and the removal control of foreign matters related to the EGR valve 18 described above are not performed and the present embodiment also differs from each embodiment in the content of the idle up control during the deceleration. FIG. 20 shows a flowchart showing an example of this control content. The flowchart of FIG. 20 differs from the process of FIG. 7 in that steps 410 to 430 and step 530 in the flowchart of FIG. 7 are omitted and step 700 is provided between step 440 and step 450.

(Idle Up Control During Deceleration)

When the process shifts to this routine, the ECU 50 executes the processes of step 400 and step 440, and executes the processes of step 700 and step 450 to step 510 if the determination result of step 440 is affirmative.

Here, in step 700, the ECU 50 calculates a target idle rotation number TidNE. That is, the ECU 50 obtains a target idle rotation number TidNE by adding a predetermined idle up rotation number KeuNE (fixed value) to a predetermined basic idle rotation number KidNE (fixed value). Here, the ECU 50 is configured to change the target idle rotation number TidNE according to an elapsed time after deceleration as shown in FIG. 9.

According to the above-described idle up control during the deceleration, when the engine 1 is decelerated, the ECU 50 performs the feedback control on the electronic throttle device 14 so that the detected engine rotation number NE becomes a predetermined target idle rotation number TidNE in order to avoid the engine stall, and sets the target idle rotation number TidNE to the predetermined first set value SV1 to avoid the engine stall from the deceleration start to the elapse of the predetermined time and shifts to the second set value SV2 lower than the first set value SV1 after the predetermined time elapsed (see FIG. 9). Here, the first set value SV1 and the second set value SV2 related to the target idle rotation number TidNE are each predetermined fixed values.

In the present embodiment, since the diagnostic control of foreign matters lodged and the removal control of foreign matters executed in the above respective embodiments are not executed, the foreign matters lodged in the EGR valve 18 are not detected, and the EGR valve 18 is not closed and opened for the reason of removing the foreign matters.

According to the configuration of the engine system in the present embodiment, the first set value SV1 and the second set value SV2 related to the target idle rotation number TidNE each become predetermined fixed values in the idle up control during the deceleration. Therefore, when the engine 1 is decelerated, the electronic throttle device 14 is subjected to a feedback control so that the detected engine rotation number NE is uniformly set to an arbitrary target idle rotation number TidNE in order to avoid the engine stall, regardless of the diagnosis of the presence or absence of the abnormality related to the opening and closing of the EGR valve 18. Here, since the target idle rotation number TidNE becomes the predetermined first set value SV1 for avoiding the engine stall until a predetermined time elapses from the start of the deceleration, for example, even if the EGR valve 18 is not fully closed due to the foreign matter FB lodged or the like and the EGR gas leaks to the intake air, the engine 1 idles-up up to the first set value SV1 in order to avoid the engine stall, thus preventing the engine stall. In addition, when a predetermined time has elapsed since the target idle rotation number TidNE becomes the first set value SV1, the target idle rotation number TidNE shifts to the second set value SV2 lower than the first set value SV1, so that the level of the idle up is reduced by one step. Therefore, even when abnormality diagnosis control (diagnostic control of foreign matters lodged) is not particularly executed for the EGR valve 18, when the EGR valve 18 is not fully closed due to the foreign matters lodged or the like during the deceleration of the engine 1, it is possible to avoid the delay in the increase of the intake air due to the idle up in the initial stage of the deceleration, thus avoiding the engine stall.

Fifth Embodiment

Next, a fifth embodiment in which an engine system is embodied in a gasoline engine system will be described in detail with reference to the accompanying drawings.
(Overview of Engine System)

Figure 21:
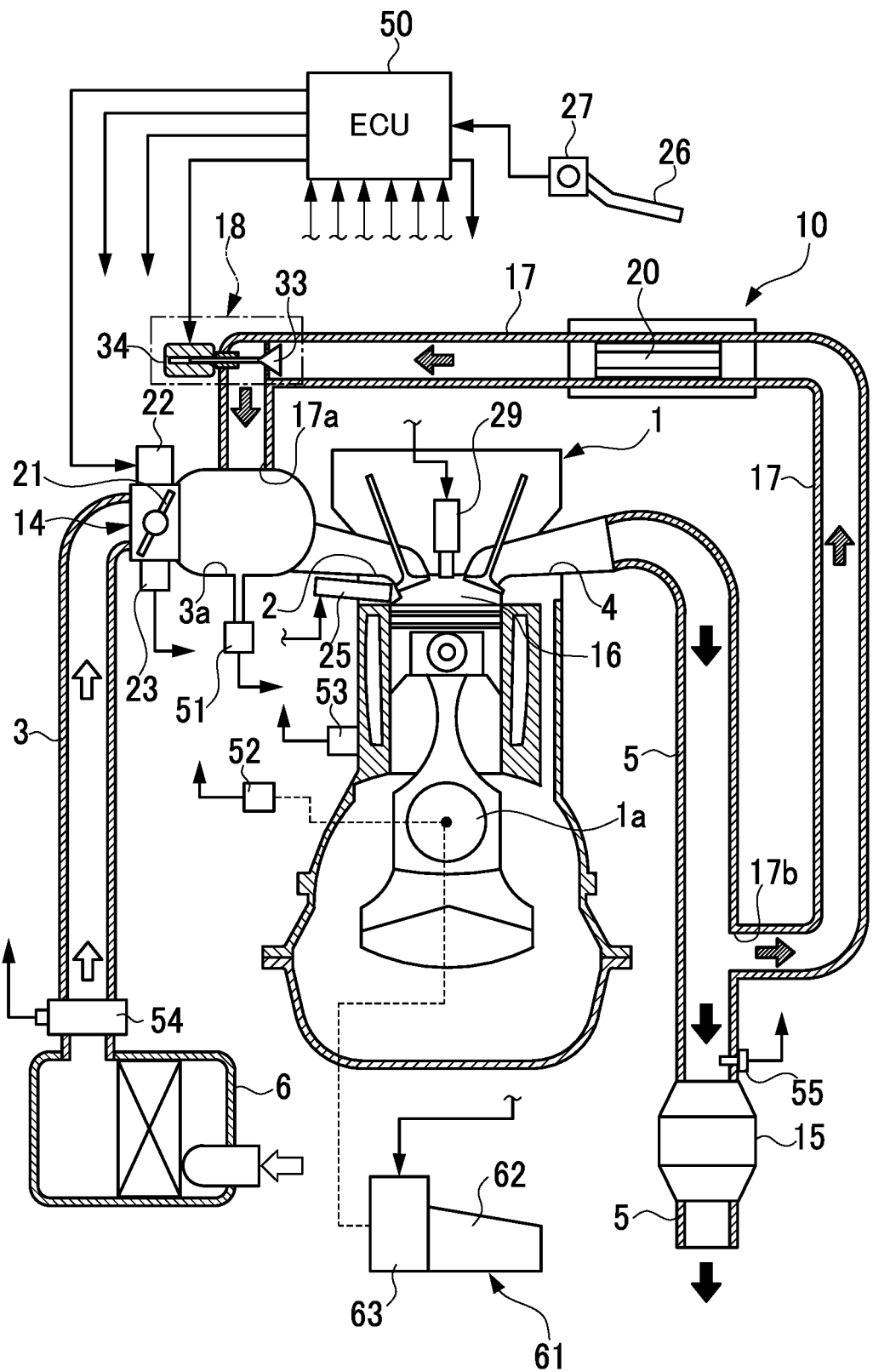
FIG. 21 is a schematic configuration diagram showing a gasoline engine system in a fifth embodiment.

FIG. 21 is a schematic configuration diagram of an engine system according to the present embodiment. As shown in FIG. 21, in this engine system, a transmission unit 61 is drivingly connected to the engine 1 (the engine system in FIG. 1 has a transmission unit, but is not shown). The transmission unit 61 includes a transmission 62 for changing an output of the engine 1 and a clutch 63 for directly connecting the engine 1 to the transmission 62 or releasing the direct connection. As is well known, the transmission 62 is configured to transmit power of the engine 1 to a drive shaft and a drive wheel (both are not shown) by changing, that is, shifting a torque or a rotation number and a rotational direction. An ECU 50 is electrically connected to the transmission unit 61 in order to control the transmission 62 and the clutch 63.

In the present embodiment, the following problems are assumed from the relationship between the return to a deceleration fuel supply from a deceleration fuel cut of the engine 1 and the drive connection between the engine 1 and the transmission 62 which are mounted on a vehicle. For example, in the control of the first embodiment, it can be assumed that a connection state between the transmission and the engine 1 is long when the engine 1 is decelerated. In this case, at the time of the return from the deceleration fuel cut, there is a possibility that a first set value SV1 of a target idle rotation number TidNE does not function due to the idle up even if the idle up control is executed during the deceleration. Here, when the connection state between the transmission and the engine 1 is long during the deceleration, the deceleration from the case where a vehicle speed or the engine rotation number is large is assumed. In a vehicle equipped with an automatic transmission (A/T) or a continuously variable transmission (CVT), a case of "lockup" is considered, and in a vehicle equipped with a manual transmission (M/T), a case of deceleration by each gear is considered. Therefore, in the present embodiment, the ECU 50 executes the following control to cope with the return from the deceleration fuel cut and the lockup between the transmission and the engine 1 during deceleration of the engine 1.

Figure 22:
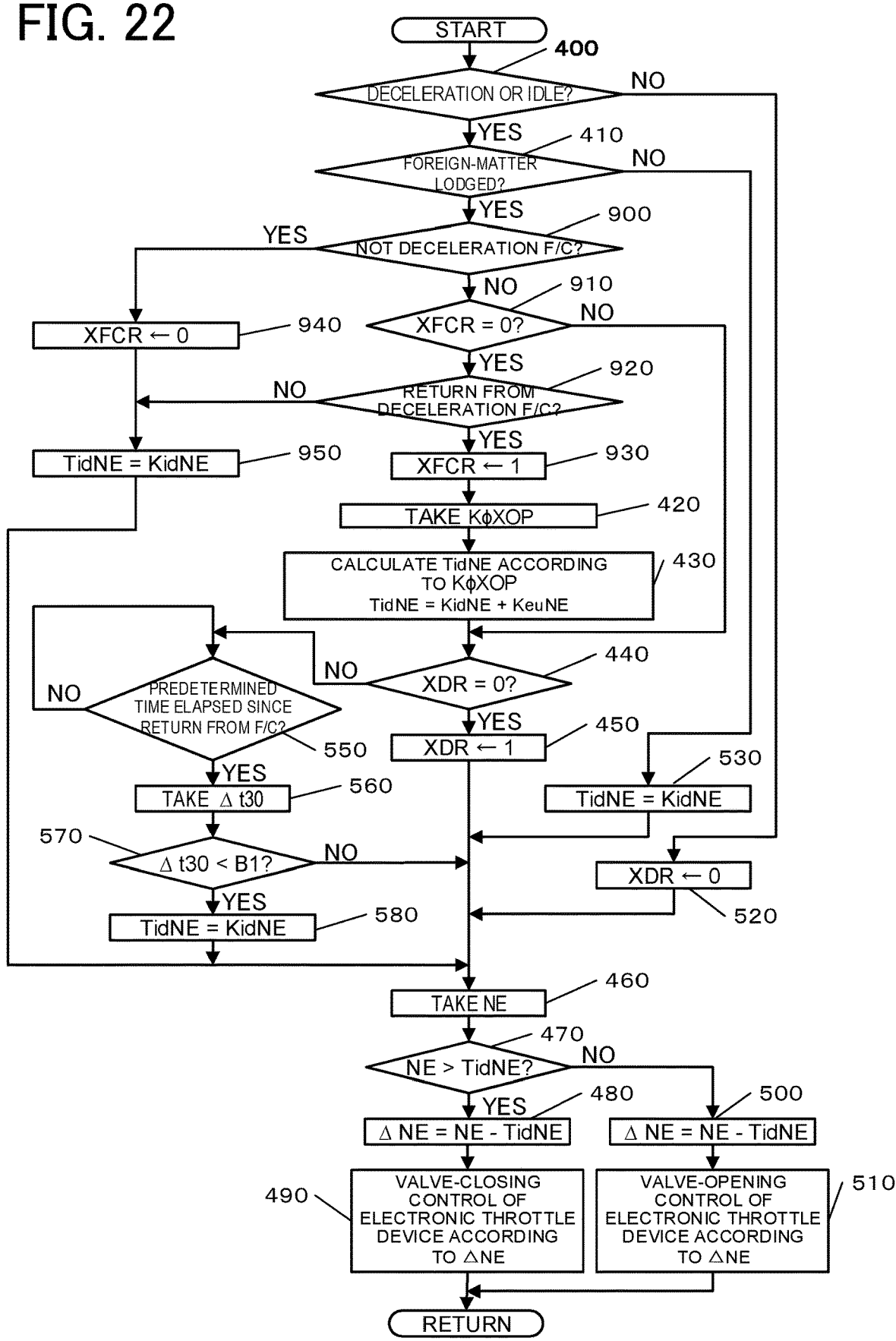
FIG. 22 is a flowchart showing a content of a control of an idle up during deceleration in the fifth embodiment.

The present embodiment differs from the first embodiment in the content of the idle up control during the deceleration. FIG. 22 shows a flowchart showing an example of this control content. The flowchart of FIG. 22 differs from the process content of FIG. 7, in that steps 900 to 930 are provided between step 410 and step 420 in FIG. 7, steps 940 and 950 are provided between step 900 and step 460, and step 540 is omitted, and a negative (NO) determination of step 440 is connected to step 550.
(Idle Up Control During Deceleration)

In this routine, an ECU 50 performs the following processes between step 410 and step 420. That is, in step 900, the ECU 50 determines whether the engine 1 is not a deceleration fuel cut (deceleration F/C). The ECU 50 shifts the process to step 910 if the determination result is negative (if the engine is not the deceleration fuel cut) and shifts the process to step 940 if the determination result is affirmative (if the engine is the deceleration fuel cut).

In step 910, the ECU 50 determines whether a deceleration fuel cut return flag XFCR is "0". As described later, the ECU 50 sets the flag XFCR to "1" at the time of returning from the deceleration fuel cut to the deceleration fuel supply. The ECU 50 shifts the process to step 920 if the determination result is affirmative and jumps the process to step 440 if the determination result is negative.

In step 920, the ECU 50 determines whether the engine 1 returns from the deceleration fuel cut (deceleration F/C) to the deceleration fuel supply. The ECU 50 shifts the process to step 930 if the determination result is affirmative and shifts the process to step 950 if the determination result is negative.

Then, in step 930, the ECU 50 sets the deceleration fuel cut return flag XFCR to "1" and shifts the processing to step 420.

On the other hand, after being shifted from step 900, in step 940, the ECU 50 sets the deceleration fuel cut return flag XFCR to "0".

Next, after being shifted from step 920 or step 940, in step 950, the ECU 50 obtains the basic idle rotation number KidNE as the target idle rotation number TidNE and shifts the process to step 460. Since the target idle rotation number TidNE does not include an idle up rotation number KeuNE, the target idle rotation number TidNE is lower than the target idle rotation number TidNE during the deceleration fuel cut and becomes a value that does not contribute to the idle up, that is, a value for releasing the idle up. That is, in this step 950, the idle up is released up to the return from the deceleration fuel cut to the deceleration fuel supply.

According to the idle up control during the deceleration described above, the ECU 50 includes the following configuration which differs from the configuration of the idle up control during the deceleration of the first embodiment. That is, when the engine 1 is decelerated and the fuel supply by the injector 25 is cut off (deceleration fuel cut), the ECU 50 ends the cut off of the fuel supply (deceleration fuel cut), returns to the deceleration fuel supply, and then executes the idle up control. In other words, the ECU 50 executes the idle up control to set the target idle rotation number TidNE to the first set value SV1 and the second set value SV2 after the return from the deceleration fuel cut of the engine 1 to the deceleration fuel supply.

Therefore, according to the configuration of the present embodiment, unlike the operations and effects of the first embodiment, the following operations and effects can be obtained. That is, in the present embodiment, when the engine 1 is decelerated and the fuel cut is performed by the injector 25, fuel is not burned by the engine 1 and therefore there is no possibility of engine stall due to the misfire. In this configuration, since the idle up control is executed after the fuel cut ends and the return to fuel supply is performed, the unnecessary idle up control is not performed when there is no possibility of the engine stall, and the necessary idle up control is performed when there is a risk of the engine stall. For this reason, when the engine 1 is decelerated, the engine stall can be reliably suppressed by the idle up at the time of the return from the fuel cut.

Further, according to the configuration of the present embodiment, when the foreign matter FB is lodged in the EGR valve 18 during the deceleration of the engine 1, the idle up control is executed according to the return from the fuel cut to the fuel supply. Therefore, even if a lockup between the engine 1 and the transmission 62 is released immediately thereafter, the target idle rotation number TidNE is set to the first set value SV1 by the idle up control. Therefore, the engine stall can be effectively avoided. In addition, even if the lockup between the engine 1 and the transmission 62 is continued, the target idle rotation number TidNE is set to the second set value SV2 by the idle up control. As a result, it is possible to suppress the deterioration in the deceleration performance of the engine 1 while avoiding the engine stall.

Sixth Embodiment

Next, a sixth embodiment in which an engine system is embodied in a gasoline engine system will be described in detail with reference to the accompanying drawings.

Figure 23:
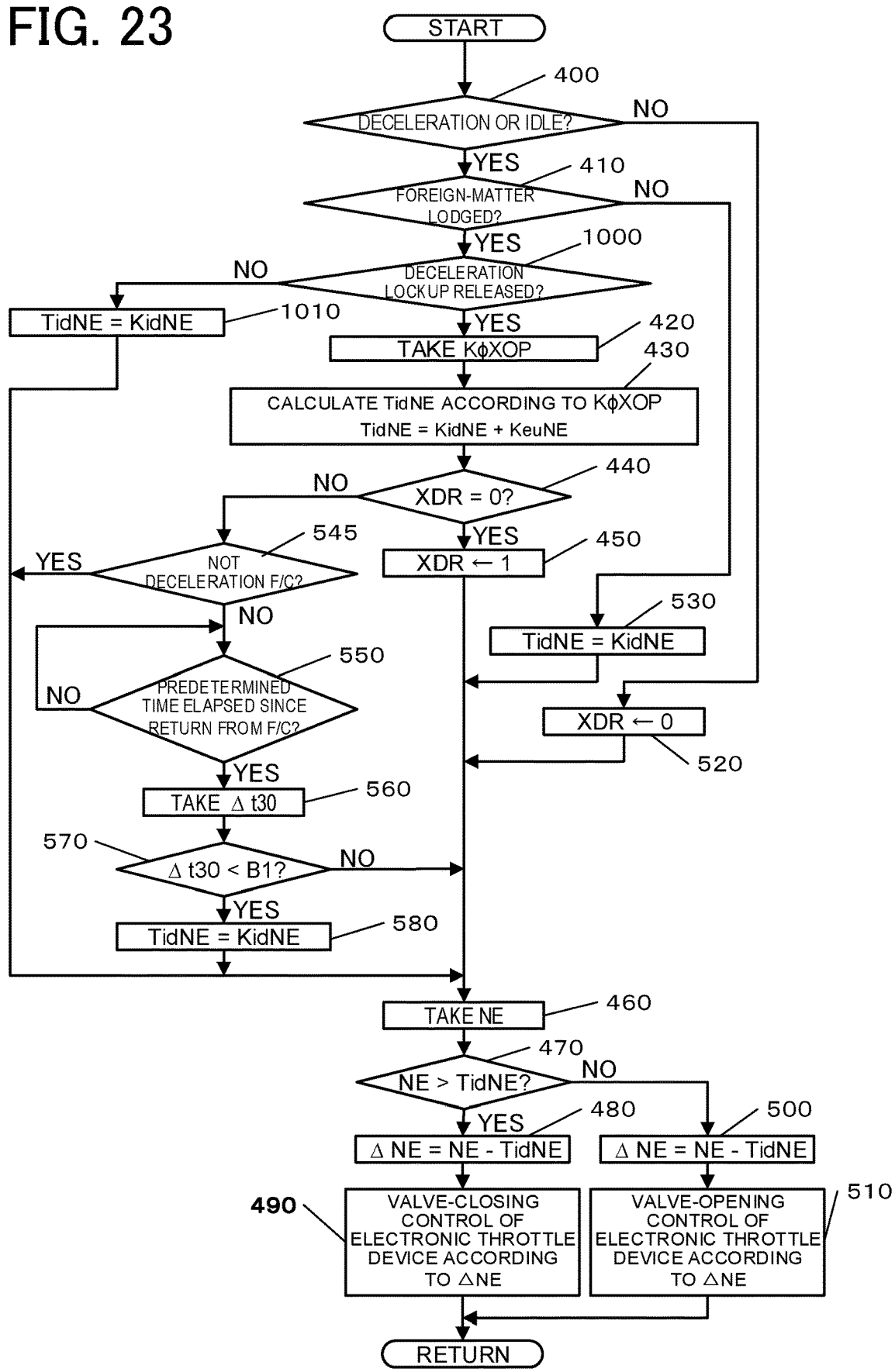
FIG. 23 is a flowchart showing a content of a control of an idle up during deceleration in a sixth embodiment.

A configuration of the present embodiment differs from that of the first embodiment in the content of the idle up control during the deceleration. FIG. 23 shows a flowchart showing an example of this control content. The flowchart of FIG. 23 differs from the process content of FIG. 7 in that step 1000 is provided between step 410 and step 420 in FIG. 7, step 1010 is provided between step 1000 and step 460, and step 545 is provided instead of step 540 in FIG. 7.

(Idle Up Control During Deceleration)

In this routine, an ECU 50 performs the following processes between step 410 and step 420. That is, in step 1000, the ECU 50 determines whether a lockup is released. In the case of an A/T vehicle, an accelerator opening degree ACC becomes constant to some extent, and therefore the lockup is to directly connect an engine 1 to a transmission 62 to improve deceleration performance of a vehicle with respect to opening and closing of an accelerator pedal 26. The ECU 50 shifts the process to step 420 if the determination result is affirmative (if the lockup is released) and shifts the process to step 1010 if the determination result is negative (if the lockup is not released).

In step 1010, the ECU 50 obtains a basic idle rotation number KidNE as a target idle rotation number TidNE and shifts the process to step 460. Since the target idle rotation number TidNE does not include an idle up rotation number KeuNE, the target idle rotation number TidNE is lower than the target idle rotation number TidNE when the lockup is released and becomes a value that does not contribute to the idle up, that is, a value for releasing the idle up.

On the other hand, after being shifted from step 440, in step 545, the ECU 50 determines whether the engine 1 is not a deceleration fuel cut (deceleration F/C). The ECU 50 shifts the process to step 550 if the determination result is negative (if the engine is not the deceleration fuel cut) and shifts the process to step 460 if the determination result is affirmative (if the engine is the deceleration fuel cut).

According to the idle up control during the deceleration described above, unlike the idle up control during the deceleration of the first embodiment, the ECU 50 includes the following configuration. That is, when the engine 1 is decelerated and the engine 1 is directly connected (lockup) to the transmission 62 by the clutch 63, the ECU 50 releases the lockup between the engine 1 and the transmission 62 by the clutch 63 and then performs the idle up control. In other words, the ECU 50 executes the idle up control to set the target idle rotation number TidNE to the first set value SV1 and the second set value SV2 at the timing when the lockup of the engine 1 and the transmission 62 is released.

Here, when the transmission 62 is an automatic transmission or a continuously variable transmission, instead of the timing of releasing the lockup, the timing when the relationship between the engine 1 and the transmission 62 becomes neutral determination is assumed as timing of starting idle up control. On the other hand, when the transmission 62 is a manual transmission, the timing when the clutch 63 switches from off to on during the deceleration, or the timing of the neutral determination can be assumed as the timing of starting the idle up control.

Figure 24:
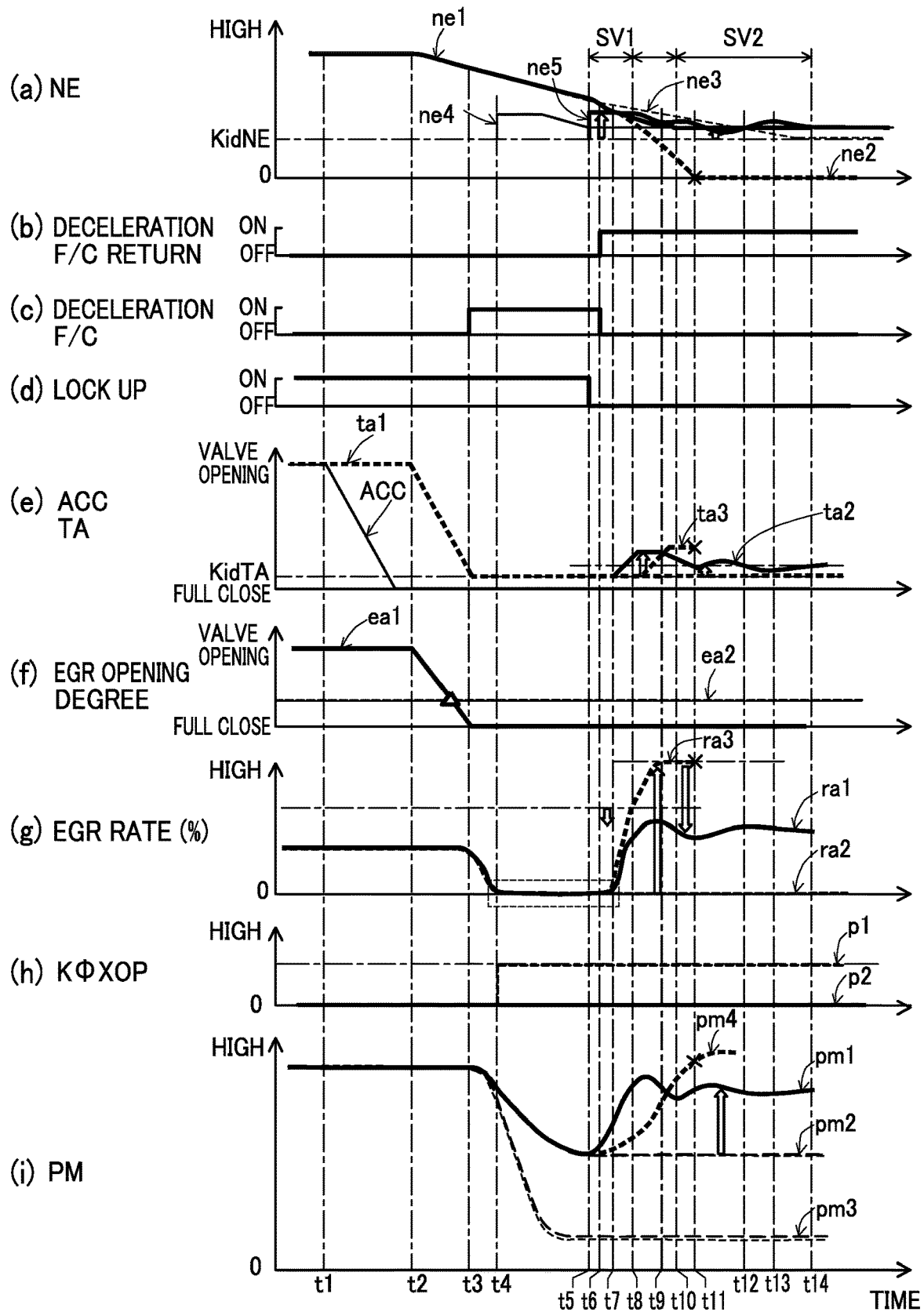
FIG. 24 shows time charts showing a behavior of various parameters at the time of performing the control of the idle up during the deceleration in the sixth embodiment.

Here, FIG. 24 shows time charts showing a behavior of various parameters at the time of executing the above-described idle up control during the deceleration. FIG. 24(a) shows an engine rotation number NE, (b) shows a deceleration fuel cut return (return from a deceleration fuel cut to a deceleration fuel supply), (c) shows the deceleration fuel cut, (d) shows the lockup, (e) shows the accelerator opening degree ACC and a throttle opening degree TA, (f) shows an EGR opening degree, (g) shows an EGR rate, (h) is a diameter of foreign-matter lodging KΦXOP, and (i) shows an intake pressure PM.

In FIG. 24(a), a thick line ne1 indicates the case where the idle up by this control is performed when foreign matters are lodged, a thick broken line ne2 indicates the case where the idle up by this control is not performed when the foreign matters are lodged, a broken line ne3 indicates the case where the idle up by this control is not performed when foreign matters are not lodged, and a solid line ne4 indicates the target idle rotation number TidNE when the foreign matters are lodged (in the case of the first embodiment). Further, various lines ne1 to ne4, ta1 to ta3, ea1, ea2, ra1 to ra3, p1, p2, and pm1 to pm4 in FIGS. 24(a) and 24(e) to 24(i) are the same as those in FIG. 11. The thick line ne5 in FIG. 24(a) indicates the target idle rotation number TidNE (in the case of the present embodiment) when the foreign matters are lodged. In FIG. 24, it is assumed that the engine rotation number NE immediately before the deceleration is higher than that in the case of FIG. 11.

In FIG. 24, when the accelerator opening degree ACC starts to be reduced at time t1 as shown by the solid line in (e), the throttle opening degree TA starts to be reduced at time t2 slightly delayed as shown by the broken line ta1 in (e) and the EGR opening degree starts to be reduced as shown by a thick line ea1 in (f). That is, the electronic throttle device 14 and the EGR valve 18 each start to be closed. Thereafter, the throttle opening degree TA reaches a predetermined deceleration opening degree (basic idle opening degree KidTA) at time t3 as indicated by the broken line ta1 in (e), and when the EGR opening degree is fully closed as indicated by the thick line ea1 in (f) and therefore the foreign matters are lodged in the EGR valve 18 immediately before time t3 as indicated by a triangular mark in (f), the EGR opening degree is not fully closed and remains open at a certain opening degree as indicated by the broken line ea2 in (f).

Here, as shown in (d), the engine 1 and the transmission 62 are in the lockup state before the deceleration, and when the deceleration determination is made at time t3, as shown in (c), the deceleration fuel cut starts.

Thereafter, when it is determined that the foreign matters are lodged in the EGR valve 18 at time t4 as indicated by the broken line p1 in (h), in the first embodiment, the idle up control starts as indicated by the solid line ne4 in (a) and the target idle rotation number TidNE is set to the first set value SV1, whereas in the present embodiment, the idle up control does not start at this time.

Thereafter, when the lockup is released at time t5 as shown in (d), in the present embodiment, as indicated by the thick line ne5 in (a), the idle up control starts and the target idle rotation number TidNE is set to the first set value SV1. Thereafter, at time t6, the deceleration fuel cut ends as shown in (c), and the return from the deceleration fuel cut is made as shown in (b) (resumption of fuel supply). Thereafter, when the actual engine rotation number NE exceeds the target idle rotation number TidNE at time t7 as indicated by the thick line ne1 in (a), the throttle opening degree TA after that is controlled as shown by the thick line ta2 in (e), and the engine rotation number NE is controlled to converge to the target idle rotation number TidNE as indicated by the thick line ne1 in (a). As a result, as indicated by the thick line pm1 in (i), the intake pressure PM which starts to be reduced after time t3 is increased by the idle up control and then becomes substantially constant. As a result, as indicated by the thick line ra1 in (g), the EGR rate whose increase is suppressed by the deceleration fuel cut after time t3 is increased within the range where the engine stall can be avoided after time t6, and thereafter is kept substantially constant. As described above, since the increase in the EGR rate is suppressed when the engine 1 is decelerated, the engine stall of the engine 1 can be avoided. This is considered to be due to an increase in an intake air amount Ga and an increase in an intake pressure PM due to the idle up.

On the other hand, when the idle up control to the target idle rotation number TidNE is not performed after time t5, as indicated by the thick broken line ra3 in FIG. 24(g), the EGR rate is continuously increased to the maximum after that, as indicated by the thick broken line pm4 in (i), the intake pressure PM is continuously increased, and as indicated by the thick broken line ne2 in (a), the engine rotation number NE becomes "0" at time t11 and the engine leads to the engine stall as shown by the cross mark. In addition, as indicated by the thick broken line ta3 in (e), even when the idle up to the target idle opening degree TidTA is not in time, the engine stall occurs at time t11 as indicated by a cross mark.

As described above, according to the configuration of the present embodiment, unlike the operations and effects of the first embodiment, the following operations and effects can be obtained. That is, in the present embodiment, when the engine 1 and the transmission 62 are locked up by the clutch 63, a rotational force of the transmission 62 is transmitted to the engine 1 when the engine 1 is decelerated, such that there is no risk of the engine stall. In this configuration, after the lockup of the engine 1 and the transmission 62 is released by the clutch 63, the idle up control is executed. Therefore, the unnecessary idle up control is not performed when there is no risk of the engine stall, and the necessary idle up control is performed when the lockup is released and there is a risk of the engine stall. For this reason, when the lockup between the engine 1 and the transmission 62 is released, the engine stall can be reliably suppressed by the idle up.

Further, according to the configuration of the present embodiment, when the foreign matter FB is lodged in the EGR valve 18, the idle up control starts at the timing when the lockup between the engine 1 and the transmission 62 is released and the target idle rotation number TidNE is set to the first set value SV1 and the second set value SV2. Therefore, even if the lockup between the engine 1 and the transmission 62 is released during the deceleration and the fuel cut is released, the target idle rotation number TidNE is set to the first set value SV1 by the idle up control. For this reason, when the lockup between the engine 1 and the transmission 62 and the fuel cut are released, the engine stall can be reliably suppressed by the idle up. Thereafter, the target idle rotation number TidNE is set to the second set value SV2 by the idle up control. As a result, it is possible to suppress the deterioration in the deceleration performance of the engine 1 while avoiding the engine stall.

Seventh Embodiment

Next, a seventh embodiment in which an engine system is embodied in a gasoline engine system will be described in detail with reference to the accompanying drawings.

In the seventh embodiment, the following problems can be assumed with respect to the fourth embodiment. That is, in the fourth embodiment, a two-stage idle up control is performed to uniformly set the target idle rotation number TidNE to the first set value SV1 and the second set value SV2 as the idle up control during the deceleration. Therefore, when the foreign matter FB is lodged in the EGR valve 18 and an outer diameter of the foreign matter FB is relatively small, a small amount of EGR gas leaks to the engine 1 during the deceleration, and the deterioration in combustion in the engine 1 becomes relatively mild. As a result, the degree of the idle up becomes rather excessive, which may deteriorate the deceleration performance of the engine 1. In the present embodiment, the idle up control during the deceleration as described later is performed.

Figure 25:
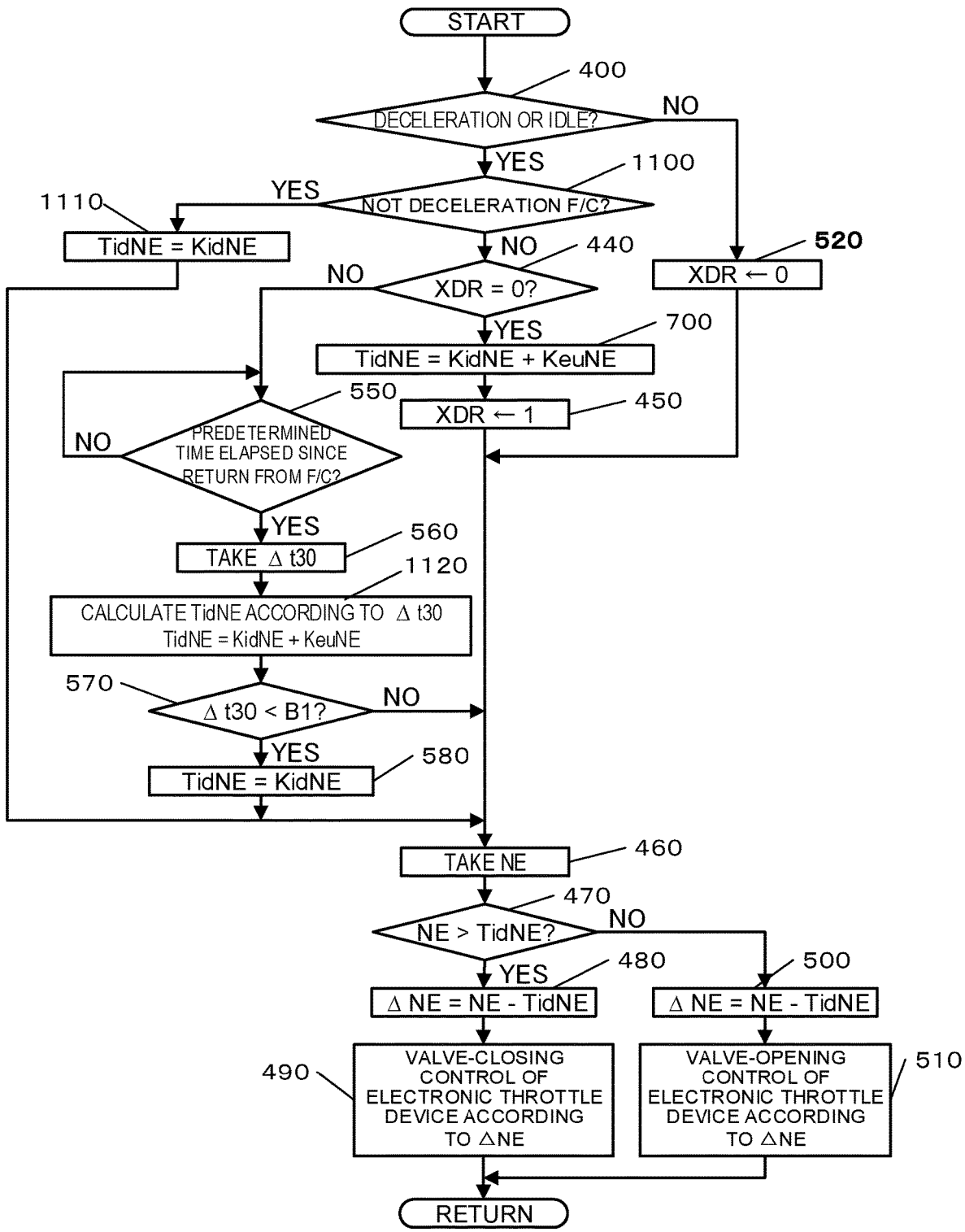
FIG. 25 is a flowchart showing a content of a control of an idle up during deceleration in a seventh embodiment.

FIG. 25 shows a flowchart showing this control content. The flowchart of FIG. 25 differs from the process content of FIG. 20 in that step 1100 is provided between step 400 and step 440 in the flowchart of FIG. 20, step 1110 is provided between step 1100 and step 460, step 540 of FIG. 20 is omitted, a negative (NO) determination of step 440 is connected to step 550, and step 1120 is provided between step 560 and step 570.

(Idle Up Control During Deceleration)

In this routine, an ECU 50 performs the following processes between step 400 and step 440. That is, in step 1100, the ECU 50 determines whether the engine 1 is not a deceleration fuel cut (deceleration F/C). The ECU 50 shifts the process to step 440 if the determination result is negative (if the engine is not the deceleration fuel cut), and shifts the process to step 1110 if the determination result is affirmative (if the engine is the deceleration fuel cut).

In step 1110, the ECU 50 obtains a basic idle rotation number KidNE as a target idle rotation number TidNE and shifts the process to step 460. Since the target idle rotation number TidNE does not include an idle up rotation number KeuNE, the target idle rotation number TidNE is lower than the target idle rotation number TidNE when the deceleration fuel cut is not performed and becomes a value that does not contribute to the idle up, that is, a value for releasing the idle up.

Figure 26:
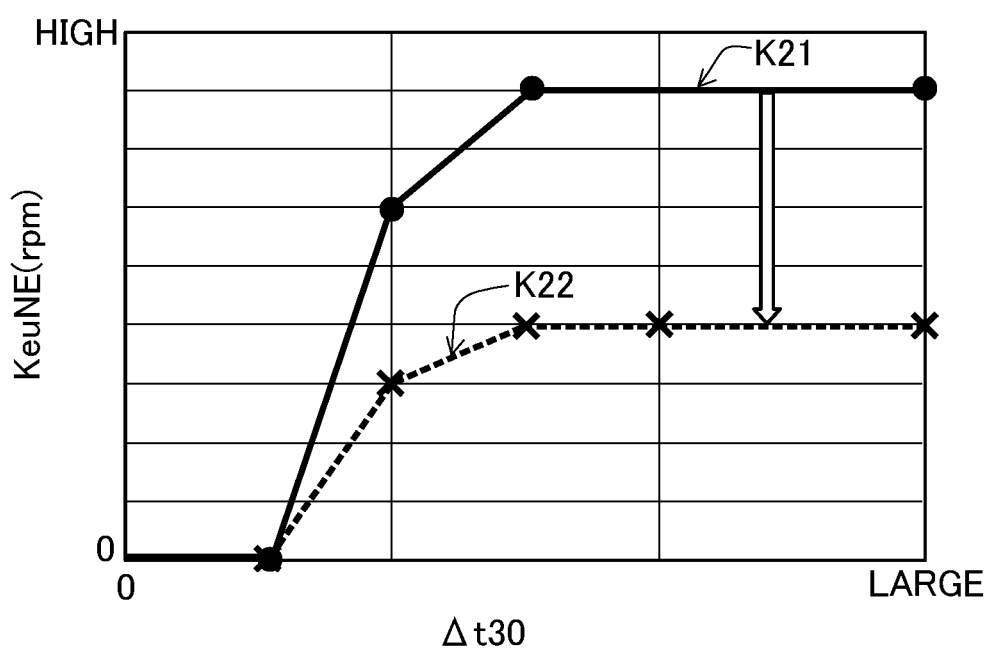
FIG. 26 is an idle up rotation number map referenced to obtain an idle up rotation number according to a 30°-time-difference ($\Delta$t30) in the seventh embodiment.
Figure 27:
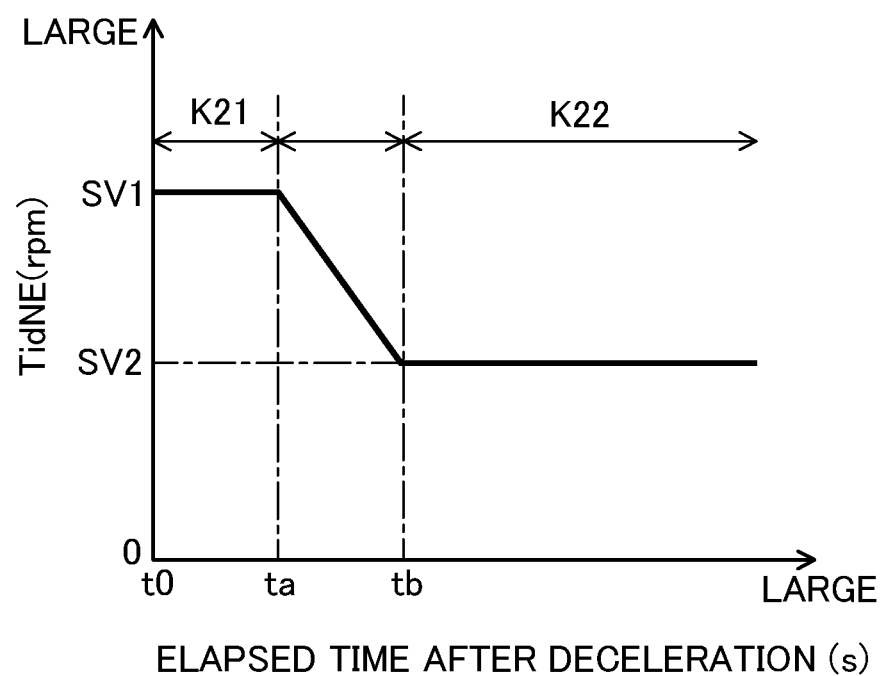
FIG. 27 is a graph showing a change in a target idle rotation number according to an elapsed time after the deceleration in the seventh embodiment.

On the other hand, when being shifted from step 560 to step 1120, the ECU 50 calculates the target idle rotation number TidNE according to the 30°-time-difference Δt30. That is, the ECU 50 obtains the target idle rotation number TidNE by adding the idle up rotation number KeuNE according to the 30°-time-difference Δt30 to the predetermined basic idle rotation number KidNE (fixed value). Here, the ECU 50 can obtain the idle up rotation number KeuNE according to the 30°-time-difference Δt30 by referring to an idle up rotation number map as shown in FIG. 26. In FIG. 26, a solid line (thick line) indicates a first increase value K21 for avoiding the engine stall, and a broken line indicates a second increase value K22 for maintaining the idle or improving the deceleration. Further, as shown by the graph in FIG. 27, the ECU 50 changes the target idle rotation number TidNE according to the elapsed time after the deceleration after determination of the deceleration. That is, as shown in FIG. 27, the ECU 50 sets the target idle rotation number TidNE to a predetermined first set value SV1 for avoiding the engine stall, from time t0 of the deceleration start to time ta when a predetermined time elapses, and shifts the target idle rotation number TidNE toward a second set value SV2 lower than the first set value SV1 after a predetermined time has elapsed, that is, after time ta. Further, the ECU 50 keeps the first set value SV1 constant from time t0 of the deceleration start to time ta, and keeps the second set value SV2 constant after time tb (tb>ta), and reduces the first set value SV1 to the second set value SV2 from time ta to time tb. Here, the ECU 50 obtains the first set value SV1 based on the first increase value K21, and obtains the second set value SV2 based on the second increase value K22. The above-described times ta and tb can be set to any values.

According to the idle up control during the deceleration described above, unlike the idle up control during the deceleration of the fourth embodiment, the ECU 50 includes the following configuration. That is, when the engine 1 is decelerated and the fuel cut is not performed by the injector 25, the ECU 50 corrects the first set value SV1 and the second set value SV2 for the idle up control according to the detected change in crank angular velocity (30°-time-difference Δt30). In other words, the ECU 50 corrects the target idle rotation number TidNE according to the change amount of the crank angular velocity (30° time t30).

Therefore, according to the configuration of the present embodiment, unlike the operations and effects of the fourth embodiment, the following operations and effects can be obtained. That is, in the present embodiment, when the engine 1 is decelerated and the fuel cut is not performed, fuel is burned in the engine 1, but the degree of combustion deterioration appears in the change of the crank angular velocity (30°-time-difference Δt30). In this configuration, when the engine 1 is decelerated and the fuel cut is not performed, the first set value SV1 and the second set value SV2 of the target idle rotation number TidNE are corrected according to the detected change in the crank angular velocity (30°-time-difference Δt30). Therefore, the target idle rotation number TidNE of the idle up control is corrected according to the degree of combustion deterioration of the engine 1. For this reason, it is possible to prevent the degree of the idle up from becoming excessive and to suppress the deterioration in the deceleration performance of the engine 1.

Note that the disclosed technique is not limited to the above embodiments, and a part of the configuration may be changed as appropriate without departing from the scope of the disclosed technique.

(1) In each of the above embodiments, the EGR device 10 is embodied as a so-called "high-pressure loop type" EGR device in the gasoline engine system not equipped with a supercharger, but in the gasoline engine system equipped with the supercharger, can also be embodied a so-called "high-pressure loop type" and "low-pressure loop type" EGR devices.

(2) In the second embodiment, when the engine rotation number NEop at the time of determination is lower than the predetermined value N1 for the target idle rotation number TidNE, the first set value SV1 is corrected to be higher than the case where the engine rotation number NEop is higher than the predetermined value N1. On the other hand, even for the target idle opening degree TidTA described in the third embodiment, the first set value (SV11) can be corrected to be higher when the engine rotation number is lower than the predetermined value than the case where the engine rotation number is higher than the predetermined value at the time of determination.

(3) In the second embodiment, when the engine rotation number NEop at the time of determination is higher than the predetermined value, the first holding time Tα to hold the target idle rotation number TidNE at the first set value SV1 and the second holding time Tβ to hold the target idle rotation number TidNE until shifting from the first set value SV1 to the second set value SV2 are each corrected to be long. On the other hand, even for the target idle opening degree TidTA described in the third embodiment, when the engine rotation number at the time of determination is higher than the predetermined value, the first holding time to hold the target idle opening degree at the first set value (SV11) and the second holding time until the target idle opening degree shifts from the first set value (SV11) to the second set value (SV12) are each corrected to be long.

(4) In each embodiment, the disclosed technique is applied to the gasoline engine system, but the disclosed technique can also be applied to a diesel engine system.

INDUSTRIAL APPLICABILITY

The present disclosure may be applied to a gasoline engine system and a diesel engine system provided with an EGR device.

REFERENCE SIGNS LIST

1 Engine
1a Crank shaft
3 Intake passage
5 Exhaust passage
10 EGR device (Exhaust gas recirculation device)
14 Electronic throttle device (Intake air regulating valve)
17 EGR passage (Exhaust gas recirculation passage)
18 EGR valve (Exhaust gas recirculation valve)
23 Throttle sensor (Operating state detection unit)
25 Injector (Fuel supply unit)
27 Accelerator sensor (Operating state detection unit)
32 Valve seat
33 Valve element
50 ECU (Control unit)
51 Intake pressure sensor (Operating state detection unit, Intake pressure detection unit)
52 Rotation number sensor (Operating state detection unit, Rotation number detection unit, Crank angular velocity detection unit)
53 Water temperature sensor (Operating state detection unit)
54 Air flow meter (Operating state detection unit)
55 Air fuel ratio sensor (Operating state detection unit)

What is claimed is:
1. A gasoline engine system comprising:
an engine;
an intake passage which introduces an intake air into the engine;
an exhaust passage which discharges an exhaust gas from the engine;
an intake air regulating valve which is placed in the intake passage and regulates an intake air amount flowing through the intake passage;
an exhaust gas recirculation device including:
an exhaust gas recirculation passage which brings a part of the exhaust gas discharged from the engine to the exhaust passage into the intake passage and brings back to the engine as an exhaust recirculation gas; and
an exhaust recirculation valve which regulates a flow rate of the exhaust recirculation gas in the exhaust gas recirculation passage,
the exhaust gas recirculation passage including an inlet and an outlet, the outlet being connected to the intake passage downstream of the intake air regulating valve, the exhaust recirculation valve including a valve seat and a valve element seatably provided on the valve seat,
an operating state detection unit which detects an operating state of the engine; and
a controller which controls at least the intake air regulating valve and the exhaust recirculation valve based on the detected operating state of the engine,
wherein
the operating state detection unit includes a rotation number detection unit which detects a rotation number of the engine,
the controller is configured to diagnose abnormality related to opening and closing between the valve seat and the valve element in the exhaust recirculation valve based on the detected operating state,
when the engine is decelerated and it is determined that the abnormality occurs, the controller performs an idle up control which includes
performing a feedback control on the intake air regulating valve so that the detected rotation number becomes a target idle rotation number in order to avoid an engine stall,
setting the target idle rotation number to a first set value in order to avoid the engine stall until a predetermined time elapses after determining occurrence of the abnormality, and
shifting the target idle rotation number to a second set value which is lower than the first set value and higher than a predetermined basic idle rotation number after the predetermined time elapses, and
the controller sets the target idle rotation number to the predetermined basic idle rotation number when no abnormality is determined to occur during deceleration of the engine.

2. The gasoline engine system according to claim 1, wherein the controller calculates the first set value related to the target idle rotation number based on a diameter of foreign-matter lodging between the valve seat and the valve element when it is determined that the abnormality occurs.

3. The gasoline engine system according to claim 1, wherein the controller calculates the second set value related to the target idle rotation number based on a diameter of foreign-matter lodging between the valve seat and the valve element when it is determined that the abnormality occurs.

4. The gasoline engine system according to claim 1, wherein
the exhaust recirculation valve includes the valve seat and the valve element seatably provided on the valve seat, and
the controller is configured to diagnose the abnormality related to the opening and closing between the valve seat and the valve element in the exhaust recirculation valve based on the detected operating state, forcibly performs a valve opening control on the intake air regulating valve to a predetermined opening degree when it is determined that the abnormality occurs, and releases the valve opening control when the detected rotation number reaches the target idle rotation number.

5. The gasoline engine system according to claim 1, wherein when the rotation number detected when it is determined that the abnormality occurs is lower than a predetermined value, the controller corrects the first set value to be higher than a case that the detected rotation number is higher than the predetermined value.

6. The gasoline engine system according to claim 1, wherein the controller corrects a time to hold the target idle rotation number to be the first set value and a time to shift the target idle rotation number from the first set value to the second set value to be longer when the rotation number at the determination of the abnormality is higher than a predetermined value.

7. The gasoline engine system according to claim 1, wherein the first set value and the second set value related to the target idle rotation number are respective predetermined fixed values.

8. The gasoline engine system according to claim 1, further comprising:
a crank angular velocity detection unit which detects a crank angular velocity of the engine; and
a fuel supply unit which supplies fuel to the engine,
wherein when the engine is decelerated and the fuel is supplied to the engine by the fuel supply unit, the controller determines presence or absence of a misfire of the engine based on a change in the detected crank angular velocity, sets the target idle rotation number to a reference idle rotation number when it is determined that there is no misfire, and releases the idle up control.

9. The gasoline engine system according to claim 1, further comprising:
a fuel supply unit which supplies fuel to the engine,
wherein in a case where the engine is decelerated and the fuel supply is shut off by the fuel supply unit, when the shut off of the fuel supply ends, the controller sets the target idle rotation number to the first set value until a predetermined time elapses, and shifts the target idle rotation number to the second set value after the predetermined time elapses.

10. The gasoline engine system according to claim 1, further comprising:
a transmission which changes an output of the engine; and
a clutch which directly connects the engine to the transmission or releases the direct connection of the engine to the transmission,
wherein when the engine is decelerated and the clutch directly connects the engine to the transmission, the controller executes an idle up control after the direct connection of the engine to the transmission is released by the clutch.

11. The gasoline engine system according to claim 1, further comprising:
a crank angular velocity detection unit which detects a crank angular velocity of the engine; and
a fuel supply unit which supplies fuel to the engine,
wherein when the engine is decelerated and the fuel supply is not shut off by the fuel supply unit, the controller corrects the first set value and the second set value according to change in the detected crank angular velocity.

* * * * *